US012682031B2

(12) United States Patent
Jin et al.

(10) Patent No.: US 12,682,031 B2
(45) Date of Patent: Jul. 14, 2026

(54) METHOD AND ELECTRONIC DEVICE FOR PERFORMING USER AUTHENTICATION FUNCTION BY USING UDC

(71) Applicant: Samsung Electronics Co., Ltd., Suwon-si (KR)

(72) Inventors: Intae Jin, Suwon-si (KR); Wonsuk Jang, Suwon-si (KR); Juwoan Yoo, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 18/397,373

(22) Filed: Dec. 27, 2023

(65) Prior Publication Data

US 2024/0126857 A1    Apr. 18, 2024

Related U.S. Application Data

(63) Continuation of application No. PCT/KR2022/007436, filed on May 25, 2022.

(30) Foreign Application Priority Data

Jul. 23, 2021    (KR) ........................ 10-2021-0097095

(51) Int. Cl.
 G06K 9/00        (2022.01)
 G06F 3/041        (2006.01)
         (Continued)

(52) U.S. Cl.
 CPC ............ G06F 21/32 (2013.01); G06F 3/0412 (2013.01); G06T 7/70 (2017.01); G06T 17/00 (2013.01); G06V 40/172 (2022.01)

(58) Field of Classification Search
 CPC ...... G06F 1/1686; G06F 1/1692; G06F 21/32; G06F 3/0412; G06T 17/00; G06T 7/593; G06T 7/70; G06V 40/161; G06V 40/172
 See application file for complete search history.

(56) References Cited

U.S. PATENT DOCUMENTS 10,212,336 B2    2/2019  Kawahara et al.
10,244,188 B2    3/2019  Saylor et al.
         (Continued)

FOREIGN PATENT DOCUMENTS

CN        109379455 A        2/2019
CN        110493523 A        11/2019
         (Continued)

OTHER PUBLICATIONS

Mascellino Alessandro et al.: ZTE reveals under-display face biometrics system for smartphones, pp. 1-2, XP093193940, Retrieved from the Internet: URL: https://www.biometricupdate.com/2021 02/zte-reveals-underdisplay-face-biometrics-system-for-smartphones Feb. 26, 2021.
         (Continued)

*Primary Examiner* — Hadi Akhavannik
(74) *Attorney, Agent, or Firm* — Jefferson IP Law, LLP

(57)        ABSTRACT

An electronic device is provided. The electronic device includes a display module, at least one camera disposed on the rear surface of the display module, memory for storing information related to user authentication, and a processor operatively connected to the display module, the at least one camera, and the memory. The processor is configured to executes a function for the user authentication, identify face position information of a user by using the at least one camera, identify coordinate information according to a user's touch input inputted through the display module, select the at least one camera based on the face position information and the coordinate information, obtain at least (Continued)

one image using the selected at least one camera, and perform the function for the user authentication based on the obtained at least one image.

20 Claims, 13 Drawing Sheets

(51) Int. Cl.

| | | |
|---|---|---|
| *G06F 21/32* | (2013.01) |
| *G06T 7/70* | (2017.01) |
| *G06T 17/00* | (2006.01) |
| *G06V 40/16* | (2022.01) |

(56) References Cited

U.S. PATENT DOCUMENTS

| | | | |
|---|---|---|---|
| 10,321,055 B2 | 6/2019 | Edwards | |
| 2008/0106628 A1 | 5/2008 | Cok et al. | |
| 2009/0009628 A1 | 1/2009 | Janicek | |
| 2009/0102763 A1 | 4/2009 | Border et al. | |
| 2016/0063235 A1* | 3/2016 | Tussy | G06Q 20/3276 |
| | | | 726/6 |
| 2017/0263077 A1* | 9/2017 | Lyons | G07F 17/3237 |
| 2018/0089939 A1* | 3/2018 | Lyons | G07F 17/3237 |
| 2019/0310724 A1* | 10/2019 | Yeke Yazdandoost | |
| | | | H10K 59/8792 |

| | | | |
|---|---|---|---|
| 2020/0389575 A1 | 12/2020 | Gove | |
| 2021/0011568 A1 | 1/2021 | Fan et al. | |
| 2021/0019437 A1* | 1/2021 | Neves Creto | G09G 5/36 |
| 2023/0067867 A1 | 3/2023 | Hu et al. | |

FOREIGN PATENT DOCUMENTS

| | | |
|---|---|---|
| CN | 110809115 A | 2/2020 |
| CN | 111833809 A | 10/2020 |
| CN | 113965743 A | 1/2022 |
| JP | 2002-278940 A | 9/2002 |
| JP | 2008-011212 A | 1/2008 |
| JP | 2019-144154 A | 8/2019 |
| KR | 10-2011-0077059 A | 7/2011 |
| KR | 10-2013-0133127 A | 12/2013 |
| KR | 10-1505229 B1 | 3/2015 |
| KR | 10-2015-0129675 A | 11/2015 |
| KR | 10-2020-0134974 A | 12/2020 |
| KR | 10-2022-0128730 A | 9/2022 |

OTHER PUBLICATIONS

Extended European Search Report dated Sep. 17, 2024, issued in European Application No. 22846028.3.

International Search Report dated Aug. 22, 2022, issued in International Patent Application No. PCT/KR2022/007436.

* cited by examiner

FIG. 4

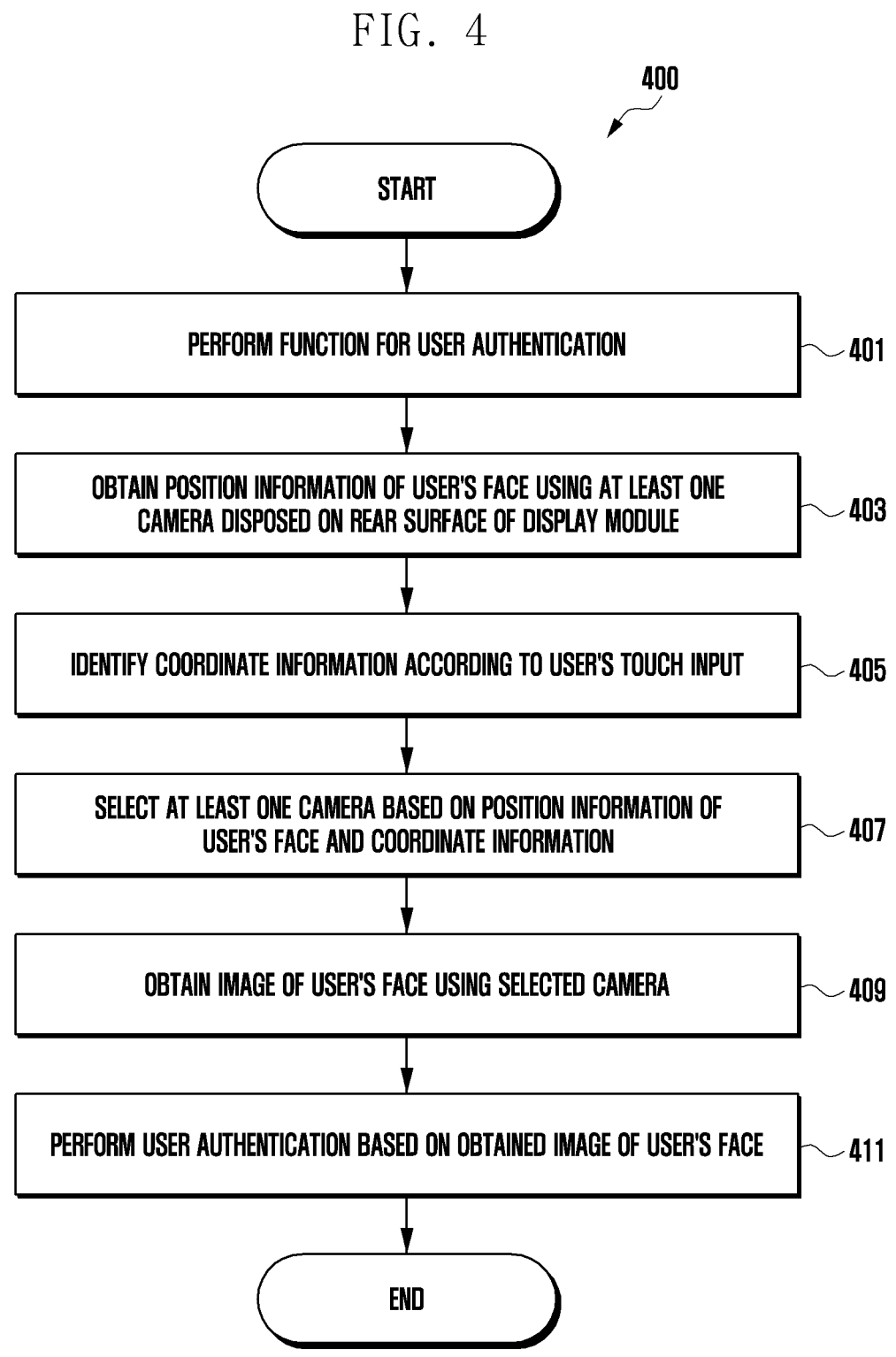

400

START

PERFORM FUNCTION FOR USER AUTHENTICATION ～401

OBTAIN POSITION INFORMATION OF USER'S FACE USING AT LEAST ONE CAMERA DISPOSED ON REAR SURFACE OF DISPLAY MODULE ～403

IDENTIFY COORDINATE INFORMATION ACCORDING TO USER'S TOUCH INPUT ～405

SELECT AT LEAST ONE CAMERA BASED ON POSITION INFORMATION OF USER'S FACE AND COORDINATE INFORMATION ～407

OBTAIN IMAGE OF USER'S FACE USING SELECTED CAMERA ～409

PERFORM USER AUTHENTICATION BASED ON OBTAINED IMAGE OF USER'S FACE ～411

END

Figure 6B:
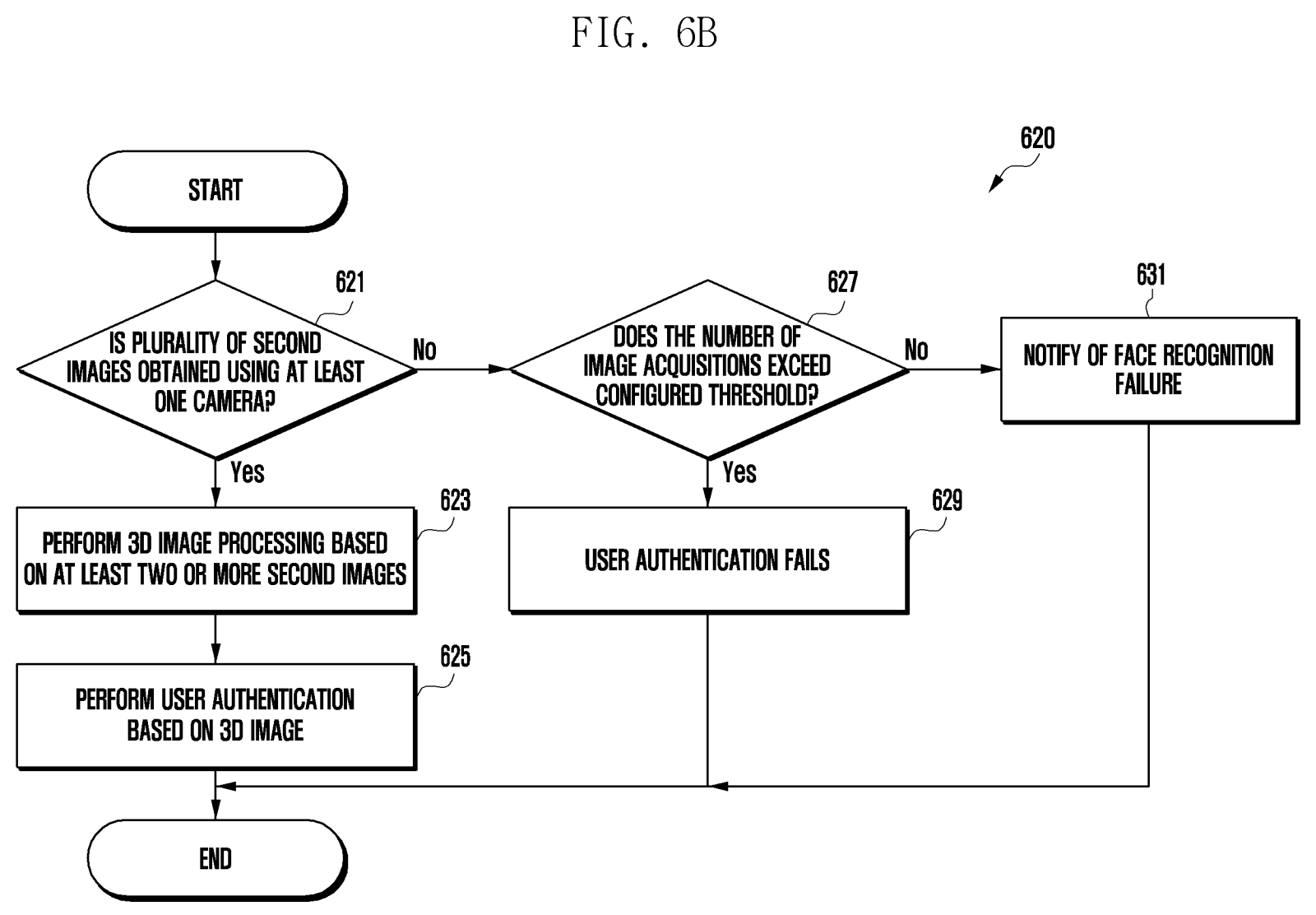

START

621
IS PLURALITY OF SECOND IMAGES OBTAINED USING AT LEAST ONE CAMERA?

Yes →

623
PERFORM 3D IMAGE PROCESSING BASED ON AT LEAST TWO OR MORE SECOND IMAGES

625
PERFORM USER AUTHENTICATION BASED ON 3D IMAGE

END

No →

627
DOES THE NUMBER OF IMAGE ACQUISITIONS EXCEED CONFIGURED THRESHOLD?

Yes →

629
USER AUTHENTICATION FAILS

No →

631
NOTIFY OF FACE RECOGNITION FAILURE

FIG. 9A

METHOD AND ELECTRONIC DEVICE FOR PERFORMING USER AUTHENTICATION FUNCTION BY USING UDC

CROSS-REFERENCE TO RELATED APPLICATION(S)

This application is a continuation application, claiming priority under § 365(c), of an International application No. PCT/KR2022/007436, filed on May 25, 2022, which is based on and claims the benefit of a Korean patent application number 10-2021-0097095, filed on Jul. 23, 2021, in the Korean Intellectual Property Office, the disclosure of which is incorporated by reference herein in its entirety.

BACKGROUND

1. Field

The disclosure relates to a method and an electronic device for performing a user authentication function using an under-display camera (UDC).

2. Description of Related Art

Electronic devices, such as portable electronic devices, are available in various sizes depending on their functions and user preferences. Electronic devices may include a large-screen touch display to ensure wide visibility and improve convenience of manipulation. The electronic device may include, as an optical module, at least one camera module disposed under a display in an internal space. At least one camera module may be disposed under the display so as to photograph an external subject by passing through at least a portion of the display. The electronic device may display a screen on the display and simultaneously photograph an external subject using at least one camera module.

The above information is presented as background information only to assist with an understanding of the disclosure. No determination has been made, and no assertion is made, as to whether any of the above might be applicable as prior art with regard to the disclosure.

SUMMARY

The electronic device includes a display that is visible from the outside through at least a portion of a cover member (e.g., a front plate, a window, or a front cover). In order to meet the demand for a large screen, the display is implemented to be visually exposed through substantially the entire area of the cover member (e.g., a front cover). The display has an expandable screen display area. As the screen display area of the display expands, various electronic components, for example, at least one camera module, disposed through the cover member also varies in their arrangement structure according thereto. For example, if the camera module is disposed in an area (e.g., a black matrix (BM) area or an inactive area) other than the display area of the cover member, there are limitations as to the expansion of the display area.

To address this issue, the camera module is disposed under the display (e.g., the arrangement structure of an under-display camera (UDC)), and a display panel is configured to have a transmittance at which the camera module is operable by lowering the arrangement density of pixels and/or electrical wires in the area corresponding to the camera module.

Aspects of the disclosure are to address at least the above-mentioned problems and/or disadvantages and to provide at least the advantages described below. Accordingly, an aspect of the disclosure is to select at least one UDC capable of performing a user authentication function among a plurality of UDCs and transparentize at least a partial area of the display panel corresponding to the at least one selected UDC.

Another aspect of the disclosure is to provide a method and an electronic device capable of simplifying the transparentizing operation of the display panel and performing a user authentication function by the UDC.

Additional aspects will be set forth in part in the description which follows and, in part, will be apparent from the description, or may be learned by practice of the presented embodiments.

In accordance with an aspect of the disclosure, an electronic device is provided. The electronic device includes a display module, at least one camera disposed on a rear surface of the display module, memory configured to store information related to user authentication, and a processor operatively connected to the display module, the at least one camera, and the memory. The processor is configured to performs a function for user authentication, identify face position information of a user using the at least one camera, identify coordinate information according to a user's touch input received through the display module, select the at least one camera, based on the face position information and the coordinate information, obtain at least one image using the at least one selected camera, and perform the function for user authentication, based on the at least one obtained image.

In accordance with another aspect of the disclosure, a method is provided. The method includes performing a function for user authentication, identifying face position information of a user using at least one camera disposed on a rear surface of a display module, identifying coordinate information according to a user's touch input received through the display module, selecting the at least one camera, based on the face position information and the coordinate information, obtaining at least one image using the at least one selected camera, and performing the function for user authentication, based on the at least one obtained image.

In accordance with another aspect of the disclosure, one or more non-transitory computer-readable recording media is provided. The one or more non-transitory computer-readable recording media storing a program including instructions that, when executed by one or more processors an electronic device, cause the electronic device to perform operations including performing a function for user authentication, identifying face position information of a user using at least one camera disposed on a rear surface of a display module, identifying coordinate information according to a user's touch input received through the display module, selecting the at least one camera, based on the face position information and the coordinate information, obtaining at least one image using the at least one selected camera, and performing the function for user authentication, based on the at least one obtained image.

Various embodiments of the disclosure enables selecting at least one camera capable of performing a user authentication function from among a plurality of cameras (e.g., under-display cameras (UDCs)) and transparentizing at least a partial area of the display panel corresponding to the at least one selected camera. The electronic device selects only a camera capable of face recognition and perform a transparentizing operation (e.g., a pixel-off operation) on a display module, thereby reducing the execution time of a user authentication function. According to another embodiment of the disclosure, a plurality of images is obtained using a plurality of cameras, and a three-dimensional (3D) image is implemented based on the plurality of images, thereby improving the security for the user authentication function. In addition, various effects that is directly or indirectly identified through this document is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flowchart illustrating a method of performing a user authentication function according to an embodiment of the disclosure;

FIG. 6B is a flowchart illustrating a method of producing a 3D image, based on a plurality of user images, and performing a user authentication function according to an embodiment of the disclosure;

FIG. 9A illustrates a first embodiment of identifying an area where a touch input is received and selecting at least one camera in an electronic device in a vertical mode according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
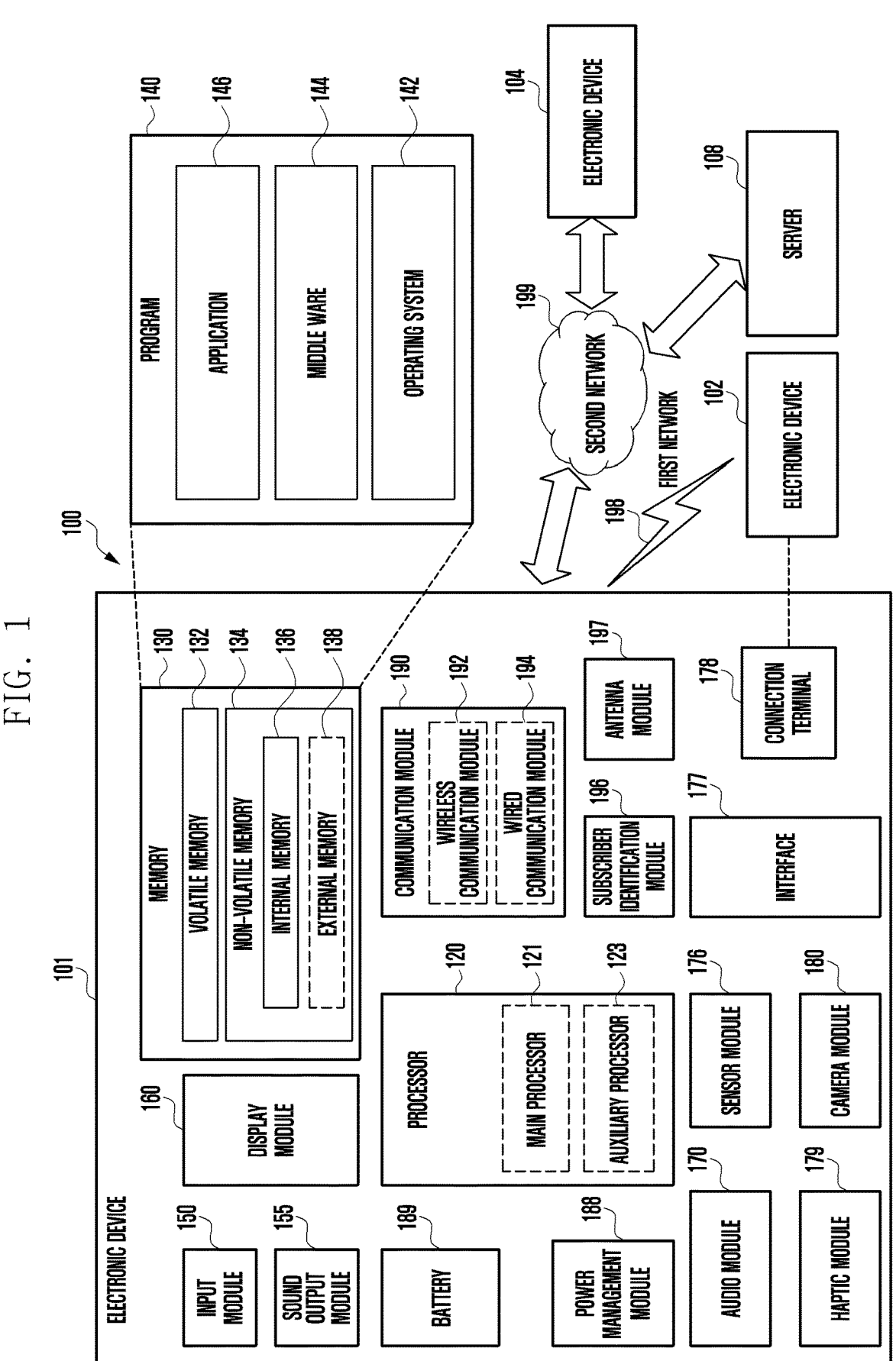
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
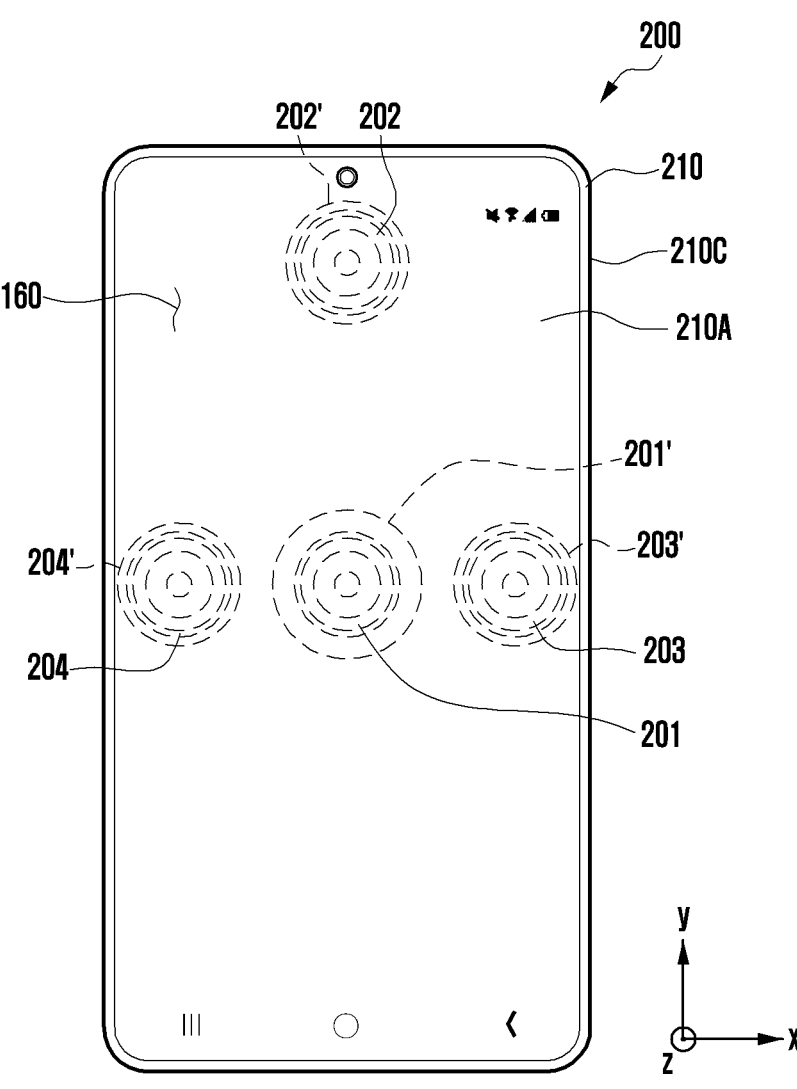
FIG. 2 is a diagram illustrating an under-display camera (UDC) disposed under a display module according to an embodiment of the disclosure.

FIG. 2 is a diagram illustrating an under-display camera (UDC) disposed under a display module according to an embodiment of the disclosure.

According to various embodiments of the disclosure, an electronic device 200 (e.g., the electronic device 101 in FIG. 1) may store, as software, at least one program (e.g., the program 140 in FIG. 1) in memory (e.g., the memory 130 in FIG. 1). For example, at least one program 140 may include at least one application (e.g., the application 146 in FIG. 1). The application 146 may be defined as application software developed to perform a designated task and may provide various functions to a user so that the user may efficiently perform the designated task. For example, a user authentication application is an application for verifying the identity of a user using the electronic device 200 and may perform a user authentication function, based on encrypted information (e.g., passwords, pattern information, and/or biometric information (e.g., fingerprint information or face information)). According to an embodiment of the disclosure, the electronic device 200 may be encrypted by the user, and when a display module (e.g., the display module 160 in FIG. 1) is activated in the encrypted electronic device 200, a lock screen may be displayed. According to an embodiment of the disclosure, the electronic device 200 may execute a user authentication application to unlock the lock screen and, if the user is verified as a registered user, unlock the lock screen.

According to an embodiment of the disclosure, when performing the user authentication function, the electronic device 200 may obtain a face image of the user using at least one camera and perform the user authentication function, based on the obtained face image. For example, when registering a user, the electronic device 200 may obtain a first image including the user's face using the camera and store the first image in the memory 130. When the user authentication function is performed, the electronic device 200 may obtain a second image including the user's face at the current time and compare and/or analyze the same with the first image stored in the memory 130. The electronic device 200 may perform the user authentication function, based on the first image and the second image.

Referring to FIG. 2, the electronic device 200 may include a housing 210 including a first surface (or front surface) 210A, a second surface (or back surface) (not shown), and a side surface 210C surrounding the space between the first surface 210A and the second surface. The electronic device 200 may have the display module 160 disposed corresponding to the first surface 210A and display content through the display module 160.

According to an embodiment of the disclosure, the display module 160 may include, for example, a liquid crystal display (LCD), a light-emitting diode (LED) display, an organic light-emitting diode (OLED) display, a micro-electromechanical systems (MEMS) display, and/or electronic paper. The electronic device 200 may display at least one piece of content (e.g., text, images, videos, icons, and/or symbols) through the display module 160. The display module 160 may include a touch screen and may receive, for example, an electronic-pen input, a touch input using a part of the user's body, a gesture input, a proximity input, and/or a hovering input. The display module 160 may include a glass cover (window panel) and/or various layers that are visually exposed to the outside.

According to an embodiment of the disclosure, the display module 160 may be disposed to occupy the entirety (bezel-less) or most of the front surface 210A (e.g., the surface on which a main screen and primary content are displayed, or the surface on which the active area is mainly disposed) of the electronic device 200. The display module 160 may be implemented so as to expand toward the side surface 210C (e.g., up/down/left/right sides) of the electronic device 200.

Referring to FIG. 2, the electronic device 200 may be configured such that at least one camera 201, 202, 203, or 204 (e.g., the camera module 180 in FIG. 1 and an under-display camera (UDC)) is disposed under the display module 160. For example, at least one camera may include a first UDC 201, a second UDC 202, a third UDC 203, and/or a fourth UDC 204. Referring to FIG. 2, although at least one UDC is illustrated to be disposed under the display module 160, the positions and number of them are not limited. The housing 210 of the electronic device 200 may include an internal space for disposing at least one UDC and include the at least one UDC that is disposed inside the internal space.

Referring to FIG. 2, at least one camera 201, 202, 203, or 204 may be disposed to be at least partially visible to the outside through the display module 160. For example, at least one camera 201, 202, 203, or 204 may be disposed in contact with the external environment through a transmission area 201', 202', 203', or 204' at least partially implemented on the front surface 210A of the display module 160. According to an embodiment of the disclosure, the area (e.g., a first transmission area 201', a second transmission area 202', a third transmission area 203', and/or a fourth transmission area 204') in which the display module 160 and at least one camera 201, 202, 203, or 204 face each other may be configured to have a predetermined transmittance as part of an area displaying content. For example, the transmission area may be configured to have a transmittance ranging from about 5% to about 20%. This transmission area may include an area overlapping the effective aperture (e.g., angle of view) (camera lens area) of the camera module through which light, which is to form an image by an image sensor for producing the image, passes. For example, the transmission areas 201', 202', 203', and 204' of the display module 160 may include areas having a lower density of pixels than the surrounding areas. For example, the transmission area may replace an opening through which at least one camera 201, 202, 203, or 204 is visually exposed to the outside.

According to an embodiment of the disclosure, the electronic device 200 may at least partially photograph an external subject, based on at least one camera 201, 202, 203, or 204, while displaying a user interface through the display module 160. For example, when photographing an external subject using at least one camera 201, 202, 203, or 204, if pixels corresponding to the transmission area 201', 202', 203', or 204' of the display module 160 is in an on state, the electronic device 200 may obtain a low-quality (e.g., low-resolution) image. For example, when photographing an external subject using at least one camera 201, 202, 203, or 204, if the pixels corresponding to the transmission area 201', 202', 203', or 204' of the display module 160 is in an off state, the electronic device 200 may obtain a high-quality (e.g., high-resolution) image.

According to an embodiment of the disclosure, the electronic device 200 may select at least one camera 201, 202, 203, or 204 from a plurality of cameras (e.g., UDC cameras) and photograph an external subject (e.g., the user's face) using the selected camera. For example, the captured image may include a first image of low-quality. According to an embodiment of the disclosure, the electronic device 200 may identify whether or not there is the user's face, based on the first image (e.g., a low-quality image). According to an embodiment of the disclosure, if there is the user's face in the first image, the electronic device 200 may identify a transmission area corresponding to the camera that captured the first image and turn off the pixels corresponding to the transmission area. The electronic device 200 may rephotograph the subject (e.g., the user's face) using the camera through the transmission area where the pixels are turned off. For example, the rephotographed image may include a second image of high quality. According to an embodiment of the disclosure, the electronic device 200 may perform a user authentication function, based on the second image (e.g., a high-quality image).

According to an embodiment of the disclosure, the electronic device 200 may select at least one camera (e.g., the first camera 201) capable of capturing the user's face and select a transmission area (e.g., the first transmission area 201') corresponding to the at least one selected camera. The electronic device 200 may turn off pixels corresponding to the determined transmission area and may capture a high-quality image (e.g., a high-quality image including the user's face) using the at least one selected camera. The electronic device 200 may perform a user authentication function, based on the captured high-quality image. The security of the user authentication function may be improved.

Referring to FIG. 2, the first camera 201 may be disposed at the center of the front surface 210A of the electronic device 200 and may include a wide-angle camera. The second camera 202, the third camera 203, and/or the fourth camera 204 may be disposed on peripheral areas apart from the center on the front surface 210A of the electronic device 200. The second camera 202, the third camera 203, and/or the fourth camera 204 may include a narrow-angle camera. According to an embodiment of the disclosure, the types of cameras, the number of cameras, and/or the positions of the cameras are not limited.

Figure 3:
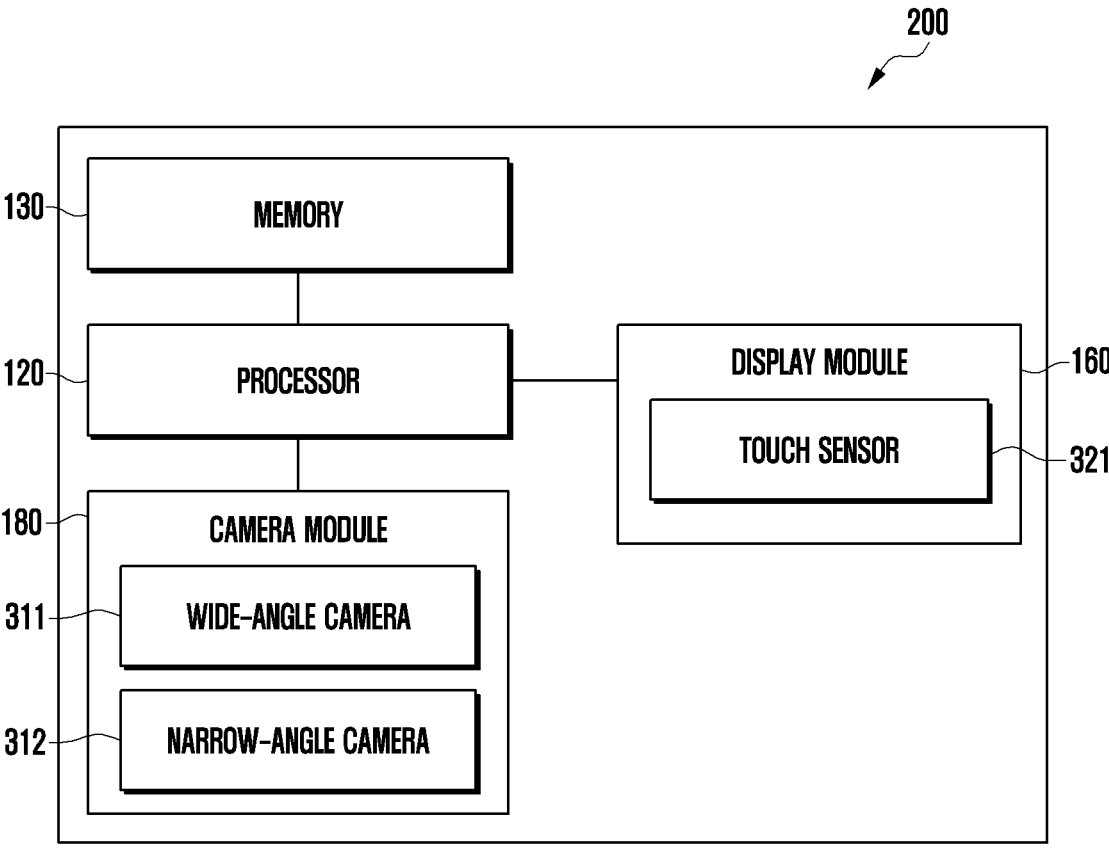
FIG. 3 is a block diagram of an electronic device according to an embodiment of the disclosure.

FIG. 3 is a block diagram of an electronic device according to an embodiment of the disclosure.

Referring to FIG. 3, the electronic device 200 (e.g., the electronic device 101 in FIG. 1) may include a processor (e.g., the processor 120 in FIG. 1), memory (e.g., the memory 130 in FIG. 1), a display module (e.g., the display module 160 in FIG. 1), and/or a camera module (e.g., the camera module 180 in FIG. 1). The camera module 180 may include a wide-angle camera 311 and/or a narrow-angle camera 312, and the display module 160 may include a touch sensor 321.

According to an embodiment of the disclosure, the electronic device 200 may perform a user authentication function, based on an image including the user's face, which is captured using the camera module 180. According to an embodiment of the disclosure, the electronic device 200 may store face-related information of the user in the memory 130 and analyze the image captured using the camera module 180, based on the face-related information. The memory 130 may store a variety of data for performing a user authentication function.

According to an embodiment of the disclosure, the electronic device 200 may perform a user authentication function by activating at least one camera (e.g., the wide-angle camera 311 and/or the narrow-angle camera 312) included in the camera module 180. For example, the wide-angle camera 311 may include a camera having a lens of a wide angle (e.g., a first angle) capable of photographing a larger area. The narrow-angle camera 312 may include a camera having a lens of a narrow angle (e.g., a second angle) capable of photographing a smaller area. For example, the camera having a first angle lens (e.g., the wide-angle camera 311) may perform photographing, based on a wider photographing range than the camera having a second angle lens (e.g., the narrow-angle camera 312). For example, an image captured by the wide-angle camera 311 may include a relatively overall view of an external subject. According to an embodiment of the disclosure, the camera module 180 may be disposed on the rear surface of the display module 160 and may include an under-display camera (UDC). According to an embodiment of the disclosure, the electronic device 200 may photograph a subject using the camera module 180 even while displaying a user interface through the display module 160. According to an embodiment of the disclosure, the electronic device 200 may initialize at least one camera included in the camera module 180 in response to a command to execute a user authentication function and activate at least one camera to photograph an external subject.

According to an embodiment of the disclosure, the display module 160 may be implemented such that at least one pixel is disposed at configured intervals and positions. The display module 160 may turn on or off at least one pixel. For example, the display module 160 may at least partially control pixels corresponding to at least a partial area (e.g., the transmission area or the area corresponding to the position where the camera module 180 is disposed). For example, if the first camera included in the camera module 180 is activated, the processor 120 may turn on or off a partial area of the display module 160 corresponding to the position where the first camera is disposed. For example, if a first area corresponding to the position where the first camera is disposed (e.g., the first area of the display module 160) is in an off state, the processor 120 may capture a high-quality image using the first camera. If the first area corresponding to the position where the first camera is disposed (e.g., the first area of the display module 160) is in an on state, the processor 120 may capture a low-quality image using the first camera. For example, the low-quality image may include an image capable of determining whether or not the user's face is included in the captured image.

According to an embodiment of the disclosure, the display module 160 may include a touch screen panel and detect a user's touch input. The display module 160 may include the touch sensor 321. Referring to FIG. 3, although it is illustrated that the display module 160 includes the touch sensor 321, the disclosure is not limited thereto. The electronic device 200 may include a sensor module (not shown) (e.g., the sensor module 176 in FIG. 1), and the sensor module may include the touch sensor 321. The touch sensor 321 may detect a user's touch input and identify coordinate information corresponding to the touch input. The electronic device 200 may determine whether or not at least some areas of the display module 160 are obscured based on the coordinate information according to the user's touch input.

According to an embodiment of the disclosure, the electronic device 200 may photograph a subject using at least one camera (e.g., the wide-angle camera 311 and the narrow-angle camera 312) included in the camera module 180, and identify whether or not the photographed subject includes a face. When photographing a subject, the electronic device 200 may turn on or off the pixels in a partial area of the display module 160 corresponding to the position where the camera is disposed. For example, at least one camera may capture a low-quality image when the display module 160 is in a pixel-on state and capture a high-quality image when the display module 160 is in a pixel-off state. According to an embodiment of the disclosure, when performing a user authentication function, the electronic device 200 may photograph a subject using the wide-angle camera 311 and determine whether or not the subject's face is included in the captured image. If the subject's face is included, the electronic device 200 may turn off the pixels in a partial area of the display module 160 corresponding to the position of the narrow-angle camera 312, and photograph a subject through the partial area using the narrow-angle camera 312. According to an embodiment of the disclosure, the electronic device 200 may capture a high-quality image by the narrow-angle camera 312 and perform a user authentication function, based on the high-quality image. According to an embodiment of the disclosure, the electronic device 200 may synthesize a plurality of images to implement a three-dimensional (3D) image and perform a user authentication function, based on the 3D image. Security according to the user authentication may be improved.

According to various embodiments of the disclosure, an electronic device 101 or 200 may include the display module 160, at least one camera 201, 202, 203, or 204 disposed on the rear surface of the display module 160, memory 130 configured to store information related to user authentication, and a processor 120 operatively connected to the display module 160, the at least one camera 201, 202, 203, or 204, and the memory 130. The processor 120 may perform a function for user authentication, identify face position information of a user using the at least one camera 201, 202, 203, or 204, identify coordinate information according to a user's touch input received through the display module 160, select the at least one camera 201, 202, 203, or 204, based on the face position information and the coordinate information, obtain at least one image using the at least one selected camera 201, 202, 203, or 204, and perform the function for user authentication, based on the at least one obtained image.

The electronic device 101 according to an embodiment may further include the touch sensor 321, and the processor 120 may detect the touch input through the touch sensor 321 and identify coordinate information corresponding to the detected touch input.

According to an embodiment of the disclosure, the at least one camera may include at least one wide-angle camera 311, and the processor 120 may obtain a first image including the user's face using the wide-angle camera 311 and identify the face position information of the user, based on the first image.

According to an embodiment of the disclosure, the at least one camera may include at least one narrow-angle camera 312, and the processor 120 may select the at least one narrow-angle camera 312, based on the face position information of the user, obtain a second image using the at least one selected narrow-angle camera 312, and perform the function for user authentication, based on the obtained second image.

According to an embodiment of the disclosure, the first image may include a low-quality image and the second image may include a high-quality image.

According to an embodiment of the disclosure, the processor 120 may identify a partial area (e.g., a transmission area 201', 202', 203', or 204') of the display module 160 corresponding to the position of the at least one selected camera and perform a transparentizing operation on the identified partial area.

According to an embodiment of the disclosure, the transparentizing operation may include turning off at least one pixel constituting the display module 160.

According to an embodiment of the disclosure, the processor 120 may select a first camera, based on the face position information of the user, perform a transparentizing operation on a partial area of the display module 160 corresponding to the first camera, and obtain the at least one image through the transparentized partial area using the first camera.

According to an embodiment of the disclosure, the processor 120 may select a second camera, if the user's face is not identified in the at least one obtained image, based on the face position information of the user, perform a transparentizing operation on a partial area of the display module 160 corresponding to the second camera, and obtain the at least one image through the transparentized partial area using the second camera.

According to an embodiment of the disclosure, the processor 120 may obtain at least one image using the at least one camera and, if the user's face is not identified in the at least one obtained image, display guide information to induce the user to gaze at the display module 160.

According to an embodiment of the disclosure, the processor 120 may produce a three-dimensional (3D) image, if there is a plurality of obtained images, based on the plurality of images, and perform the function for user authentication, based on the produced 3D image.

According to an embodiment of the disclosure, the processor 120 may determine whether or not the user's face is identified based on the at least one obtained image and, if the user's face is not identified, deactivate a camera that captured the image in which the user's face is not identified.

FIG. 4 is a flowchart 400 illustrating a method of performing a user authentication function according to an embodiment of the disclosure.

According to various embodiments of the disclosure, an electronic device (e.g., the electronic device 101 in FIG. 1 or the electronic device 200 in FIG. 2) may have a camera module (e.g., the camera module 180 in FIG. 1 or an under-display camera (UDC)) on the rear surface of a display module (e.g., the display module 160 in FIG. 1). In response to execution of a user authentication function, the electronic device 101 may obtain an image including the user's face through the camera module 180 and perform the user authentication function, based on the obtained image. According to an embodiment of the disclosure, a processor (e.g., the processor 120 in FIG. 1) of the electronic device 101, in response to the execution of the user authentication function, may perform a pixel-off operation on at least a partial area (e.g., the transmission area) of the display module 160 corresponding to the position where the camera module 180 is disposed. For example, the processor 120 may obtain an image of a subject (e.g., a high-quality image) through the display module 160 in the pixel-off state and perform the user authentication function, based on the obtained image. According to an embodiment of the disclosure, at least one camera module 180 may obtain an image including the subject's face through at least a partial area (e.g., the transmission area or an display area in the pixel-off state) of the display module 160. The processor 120 may perform the user authentication function, based on the obtained image.

In operation 401, the processor 120 may perform a function for user authentication. For example, when attempting to unlock the lock screen of the electronic device 101, the processor 120 may perform the user authentication function. The electronic device 101 may perform a function for user authentication while the lock screen is being displayed through the display module 160. The processor 120 may at least partially activate at least one camera (e.g., a wide-angle camera (e.g., the wide-angle camera 311 in FIG. 3 or the narrow-angle camera 312 in FIG. 3)) included in the camera module 180.

In operation 403, the processor 120 may obtain position information of the user's face using at least one camera (e.g., the wide-angle camera 311) disposed on the rear surface of the display module 160. The processor 120 may photograph a subject (e.g., the user) through at least a partial area of the display module 160 using at least one activated camera. For example, the user may be looking at the display module 160, and the captured image of the user may include the user's face. For example, the electronic device 101 may photograph the user using the wide-angle camera 311 in order to photograph a wider area. The processor 120 may obtain position information of the user's face (e.g., information about the direction in which the user is gazing and information about the angle of the user's face), based on the user's image. According to an embodiment of the disclosure, the processor 120 may identify the position of the user's face, based on the captured image of the user, and, based on the identified position of the user's face, determine at least one camera capable of obtaining an image including the user's face from among a plurality of cameras included in the camera module 180.

In operation 405, the processor 120 may identify coordinate information according to a user's touch input, based on a touch sensor (e.g., the touch sensor 321 in FIG. 3) included in the display module 160. For example, when performing the user authentication function, the electronic device 101 may be held by the user, and the processor 120 may identify coordinate information according to the user's touch input while being held. According to another embodiment of the disclosure, the electronic device 101 may further include a grip sensor to determine whether or not the user grips the electronic device and identify coordinate information according to the user's grip through the grip sensor.

In operation 407, the processor 120 may select at least one camera (e.g., the narrow-angle camera 312) from among cameras included in the camera module 180, based on face position information of the user and the coordinate information. For example, the processor 120 may select at least one camera suitable for performing a user authentication function. For example, the processor 120 may select at least one camera disposed at a position capable of photographing the user's face. For example, the processor 120 may select at least one camera disposed at a position where the lens of the camera is not obscured by a user's touch input.

In operation 409, the processor 120 may obtain an image including the user's face using the selected camera. According to an embodiment of the disclosure, the electronic device 101 may select at least one camera capable of obtaining a face image of the user from among a plurality of cameras disposed corresponding to the front surface of the display module 160 and capture an image including the user's face using the at least one selected camera. According to an embodiment of the disclosure, if at least one camera is selected, the processor 120 may identify a transmission area corresponding to the position of the at least one selected camera. For example, the transmission area corresponds to a partial area of the display module 160 and may include an area through which light is transmitted when a camera positioned on the rear surface of the display module 160 captures an image. For example, at least one camera may capture the user's face through the transmission area of the display module 160. According to an embodiment of the disclosure, when photographing the user's face using at least one camera, the processor 120 may turn off the pixels in the transmission area of the display module 160, thereby capturing a high-quality image. For example, the processor 120 may capture a high-quality image using at least one camera when the transmission area is in a pixel-off state, and capture a low-quality image using at least one camera when the transmission area is in a pixel-on state.

In operation 411, the processor 120 may perform user authentication (e.g., a user authentication function), based on the obtained image including the user's face. According to an embodiment of the disclosure, the processor 120 may perform a user authentication function, based on the high-quality image including the user's face, so that the security according to the user authentication function may be improved. According to an embodiment of the disclosure, the processor 120 may capture a plurality of high-quality images using a plurality of cameras and implement a 3D image, based on the plurality of high-quality images. According to an embodiment of the disclosure, the processor 120 may perform a user authentication function, based on the 3D image, and the security of the user authentication function may be improved.

Figure 5:
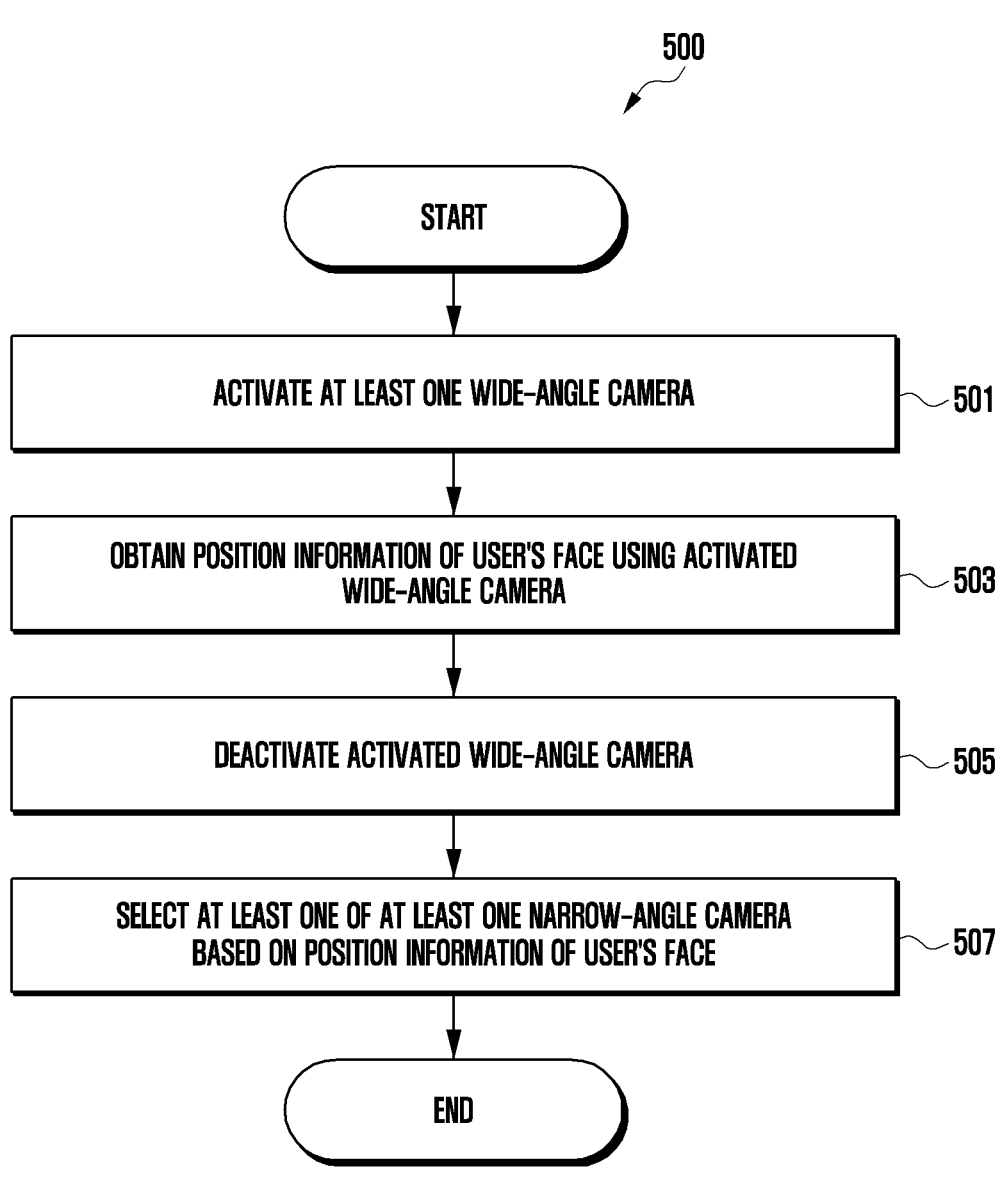
FIG. 5 is a flowchart illustrating a method of selecting at least one camera according to an embodiment of the disclosure.

FIG. 5 is a flowchart 500 illustrating a method of selecting at least one camera according to an embodiment of the disclosure.

According to an embodiment of the disclosure, an electronic device (e.g., the electronic device 101 in FIG. 1 or the electronic device 200 in FIG. 2) may have at least one camera (e.g., the camera module 180 in FIG. 1, the wide-angle camera 311 in FIG. 3, and/or the narrow-angle camera 312 in FIG. 3) on the rear surface of a display module (e.g., the display module 160 in FIG. 1). According to an embodiment of the disclosure, the electronic device 101, in response to execution of a user authentication function, may select at least one camera and capture an image including the user's face using the at least one selected camera.

In operation 501, a processor (e.g., the processor 120 in FIG. 1) of the electronic device 101 may activate at least one wide-angle camera 311. For example, the electronic device 101 may perform a user authentication function and activate at least one wide-angle camera 311 while a user interface is displayed through the display module 160. For example, at least one wide-angle camera 311 may be disposed on the rear surface of the display module 160 and, when photographing, photograph an external subject (e.g., the user) through at least a partial area of the display module 160. For example, the wide-angle camera 311 may capture a larger area than the narrow-angle camera 312, and the processor 120 may more accurately identify the direction in which the user is gazing based on the image captured through the wide-angle camera 311. For example, the wide-angle camera 311 may be disposed in the center of the display module 160 and may capture an image that makes it easy to identify the user's gaze direction (e.g., left, right, up, or down).

In operation 503, the processor 120 may obtain position information of the user's face using the activated wide-angle camera 311. For example, the processor 120 may capture an image including the user's face using the wide-angle camera 311 and identify the direction in which the user is gazing. According to an embodiment of the disclosure, the processor 120 may select at least one narrow-angle camera 312, based on the position information of the user's face. For example, the narrow-angle camera 312 may capture an image in a smaller photographing range than the wide-angle camera 311. For example, when the user is gazing in a designated direction, the processor 120 may select at least one narrow-angle camera 312 disposed to correspond to the designated direction. According to an embodiment of the disclosure, the processor 120 may obtain a first image (e.g., a low-quality image) using the wide-angle camera 311 while the user interface is being displayed through the display module 160. For example, the wide-angle camera 311 may capture an image through at least a partial area of the display module 160, thereby obtaining a low-quality image. For example, the low-quality image may include an image enabling the user's gaze direction to be identified.

In operation 505, the processor 120 may obtain position information of the user's face (e.g., information about the direction the user is gazing) and then deactivate the activated wide-angle camera 311. For example, the wide-angle camera 311 may be a camera suitable for obtaining position information of the user's face. For example, the wide-angle camera 311 may photograph a larger area, but it may be difficult to photograph the user's face to perform a user authentication function. According to an embodiment of the disclosure, the processor 120 may switch the wide-angle camera 311 from an active state to an inactive state and reduce current consumption of the wide-angle camera 311.

In operation 507, the processor 120 may select at least one of the at least one narrow-angle camera 312, based on the position information of the user's face. For example, if the user gazes in the left direction based on the center of the display module 160, the processor 120 may select the narrow-angle camera 312 disposed corresponding to the left direction. For example, if the user gazes in the upward direction based on the center of the display module 160, the processor 120 may select the narrow-angle camera 312 disposed corresponding to the upward direction. According to an embodiment of the disclosure, the processor 120 may select at least one narrow-angle camera 312, based on the position information of the user's face, and perform a user authentication function using the at least one selected narrow-angle camera 312. According to an embodiment of the disclosure, the wide-angle camera 311 may include a camera having a first photographing range (e.g., a lens supporting a photographing area at a first angle), and the narrow-angle camera 312 may include a camera having a second photographing range (a lens supporting a photographing area at a second angle). The second angle may be smaller than the first angle, and the second photographing range may be smaller than the first photographing range. For example, the wide-angle camera 311 may capture a larger photographing range (e.g., photographing area) than the narrow-angle camera 312.

According to another embodiment of the disclosure, if a plurality of narrow-angle cameras 312 is selected, the processor 120 may capture a plurality of images corresponding to the plurality of narrow-angle cameras 312 and, based on the plurality of images, perform a user authentication function. According to another embodiment of the disclosure, since the user authentication function is performed using a plurality of images, the security according to the user authentication function may be improved.

Figure 6A:
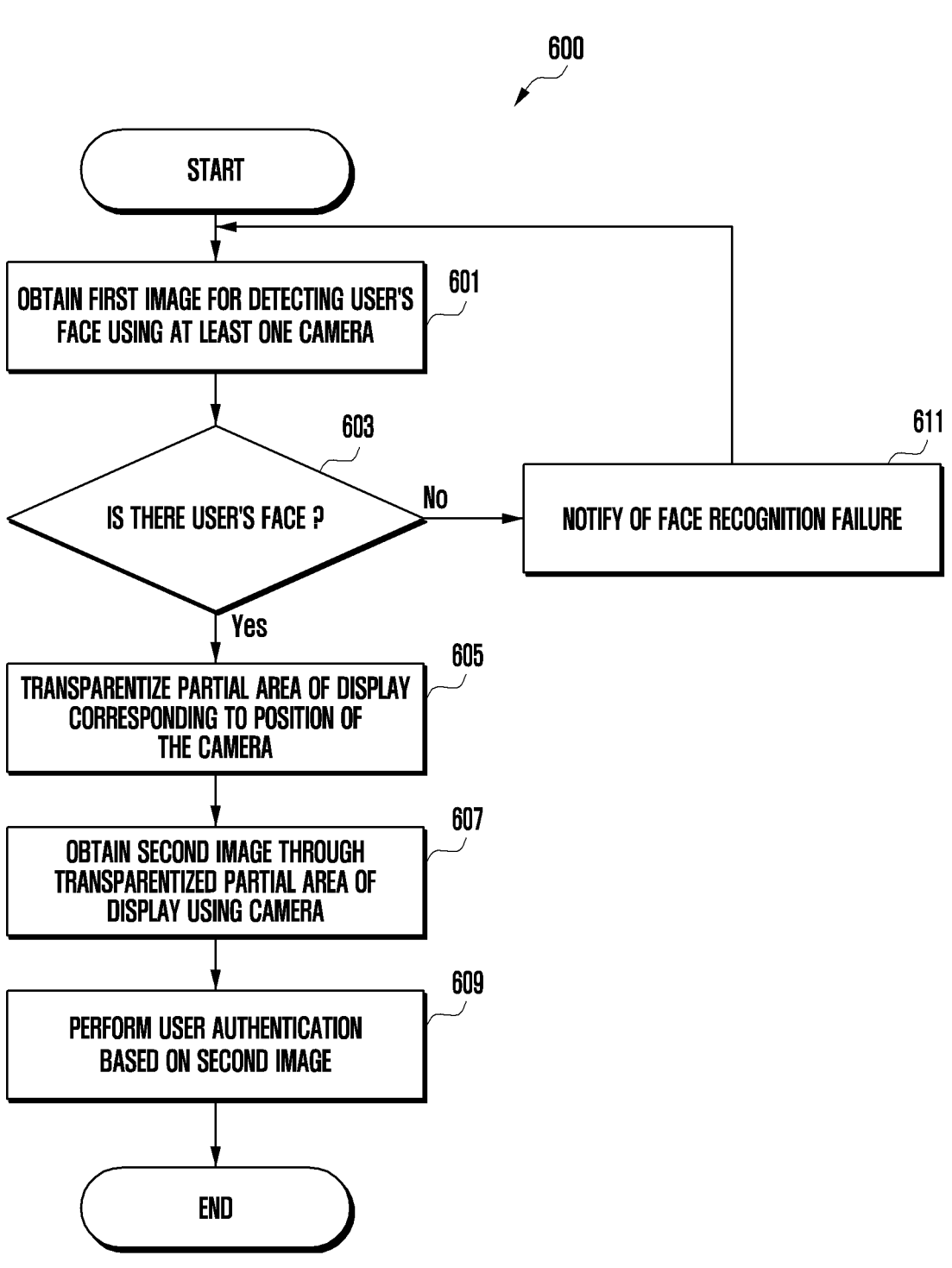
FIG. 6A is a flowchart illustrating a method of obtaining an image for user authentication through a transparentized display module according to an embodiment of the disclosure.

FIG. 6A is a flowchart 600 illustrating a method of obtaining an image for user authentication through a transparentized display module according to an embodiment of the disclosure.

According to an embodiment of the disclosure, an electronic device (e.g., the electronic device 101 in FIG. 1 or the electronic device 200 in FIG. 2) may have at least one camera (e.g., the camera module 180 in FIG. 1, the wide-angle camera 311 in FIG. 3, and/or the narrow-angle camera 312 in FIG. 3) on the rear surface of a display module (e.g., the display module 160 in FIG. 1). According to an embodiment of the disclosure, the electronic device 101, in response to execution of a user authentication function, may select at least one camera and capture an image including the user's face using the at least one selected camera. At least one camera may be disposed on the rear surface of the display module 160 and, when photographing, obtain an image through at least a partial area of the display module 160. According to an embodiment of the disclosure, the electronic device 101 may transparentize (e.g., pixel-off) a partial area (e.g., the transmission area or an area having a camera lens disposed adjacent thereto) of the display module 160 corresponding to the position of at least one camera. The electronic device 101 may capture an image using at least one camera, based on the transparentized partial area of the display module 160, thereby obtaining a high-quality image.

In operation 601, a processor (e.g., the processor 120 in FIG. 1) of the electronic device 101 may obtain a first image for detecting the user's face using at least one camera (e.g., a wide-angle camera). For example, the processor 120 may capture the first image using a wide-angle camera for capturing a larger area, but the camera is not limited to the wide-angle camera. According to an embodiment of the disclosure, the processor 120 may activate at least one camera while a user interface being is displayed through the display module 160 and obtain the first image using the at least one activated camera. For example, the first image may include a low-quality image.

In operation 603, the processor 120 may identify whether or not there is the user's face in the first image. For example, the processor 120 may photograph the user using a camera disposed on the rear surface of the display module 160 and identify whether or not the user is gazing at the display module 160. According to an embodiment of the disclosure, the processor 120 may identify position information of the user's face and identify a direction in which the user is gazing.

If there is the user's face in the first image in operation 603, the processor 120 may transparentize a partial area of the display module 160 corresponding to the position of the camera in operation 605. For example, the camera may be disposed on the rear surface of the display module 160, and the lens of the camera may be disposed in close contact with the rear surface of the display module 160. When photographing, the camera may photograph a subject through a partial area (e.g., a transmission area) of the display module 160. According to an embodiment of the disclosure, the processor 120 may perform a transparentizing process (e.g., pixel-off) on a partial area (e.g., a transmission area) of the display module 160 and photograph a subject through the transparentized partial area using the camera.

In operation 607, the processor 120 may obtain a second image through the transparentized partial area (e.g., a transmission area) of the display module 160 using a camera (e.g., a narrow-angle camera). For example, the processor 120 may capture the second image using a narrow-angle camera for capture the user's face more precisely, but the camera is not limited to the narrow-angle camera. According to an embodiment of the disclosure, the processor 120 may obtain the second image through the transparentized partial area of the display module 160 using the camera. For example, the second image may include a high-quality image. For example, the second image may include an image in which the user's face is captured.

In operation 609, the processor 120 may perform a user authentication function, based on the obtained second image. For example, since the processor 120 performs a user authentication function, based on the second image, which is a high-quality image, the security according to user authentication may be improved.

If there is no user's face in the first image in operation 603, the processor 120 may display a notification of face recognition failure through the display module 160 in operation 611. For example, the processor 120 may display a notification message, such as "Please look at the screen" through the display module 160 and induce the user to gaze at the center of the display module 160. For example, the processor 120 may provide guide information such that the user gazes at the center of the display module 160.

FIG. 6B is a flowchart 620 illustrating a method of producing a 3D image, based on a plurality of user images, and performing a user authentication function according to an embodiment of the disclosure.

According to an embodiment of the disclosure, an electronic device (e.g., the electronic device 101 in FIG. 1 or the electronic device 200 in FIG. 2) may have at least one camera (e.g., the camera module 180 in FIG. 1, the wide-angle camera 311 in FIG. 3, and/or the narrow-angle camera 312 in FIG. 3) on the rear surface of a display module (e.g., the display module 160 in FIG. 1). According to an embodiment of the disclosure, the electronic device 101, in response to execution of a user authentication function, may select at least one camera and capture an image including the user's face using the at least one selected camera. According to an embodiment of the disclosure, if a plurality of images is captured, the electronic device 101 may implement a 3D image, based on the plurality of images, and perform a user authentication function, based on the 3D image. According to an embodiment of the disclosure, the electronic device 101 may configure the number of times to capture an image including the user's face and, if the number of times to capture an image exceeds a configured threshold, terminate the user authentication function.

In operation 621, a processor (e.g., the processor 120 in FIG. 1) of the electronic device 101 may identify whether or not a plurality of second images is obtained using at least one camera. For example, the second image may be an image including the user's face and may include a high-quality image. For example, the processor 120 may obtain one image using a first camera and obtain another image using a second camera. For example, the first camera and the second camera may be positioned on the rear surface of the display module 160, but may be different in their positions from each other. The first camera and the second camera may be disposed adjacent to each other on different sides. For example, the processor 120 may obtain a plurality of second images using a plurality of cameras. The second image may include a high-quality image capable of performing a user authentication function.

If a plurality of second images is obtained in operation 621, the processor 120 may perform 3D image processing, based on at least two or more second images in operation 623. For example, the processor 120 may implement a 3D image, based on the plurality of second images. The 3D image may include a three-dimensional user's face. According to an embodiment of the disclosure, even if the second image is implemented in three dimensions, it may include a high-quality image capable of performing a user authentication function.

In operation 625, the processor 120 may perform a user authentication function, based on the 3D image. For example, since the user's face is processed and implemented in 3D, the security according to the user authentication function may be improved.

In case that one second image is obtained in operation 621, the processor 120 may identify whether or not the number of image acquisitions exceeds a configured threshold in operation 627. For example, the processor 120 may configure the number of times the second image is captured during a predetermined period of time as a threshold and identify whether or not the number of acquisitions for the second image exceeds the configured threshold. For example, if the second image does not include the user's face, the processor 120 may recapture the second image, and the number of acquisitions for the second image may increase.

If the number of image acquisitions for the second image exceeds the threshold in operation 627, the processor 120 may identify that the user authentication function has failed in operation 629. For example, if the user fails to continue to gaze at the display module 160 of the electronic device 101, the second image does not include the user's face, and the electronic device 101 fails to perform the user authentication function.

If the number of image acquisitions for the second image does not exceed the threshold in operation 627, the processor 120 may display a notification of face recognition failure through the display module 160 in operation 631. For example, the processor 120 may display a notification message to induce the user to gaze at the display module 160.

Figure 7A:
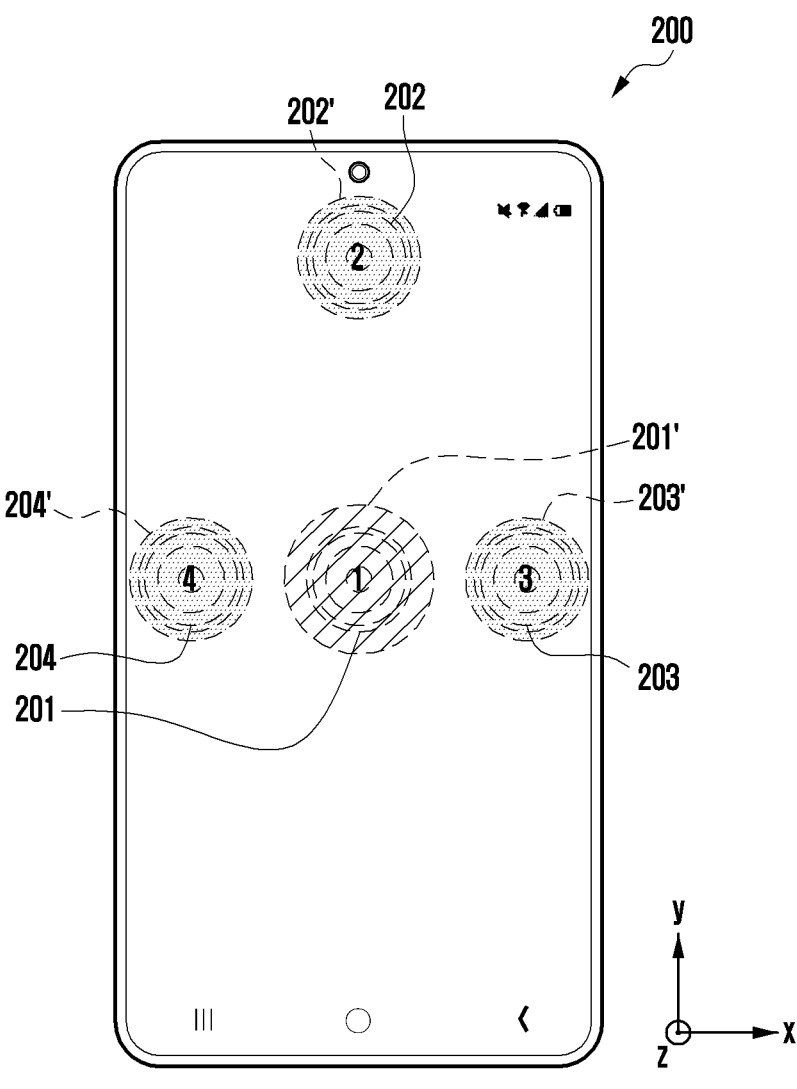
FIG. 7A is a diagram illustrating the position of a camera in a vertical mode according to an embodiment of the disclosure.
Figure 7B:
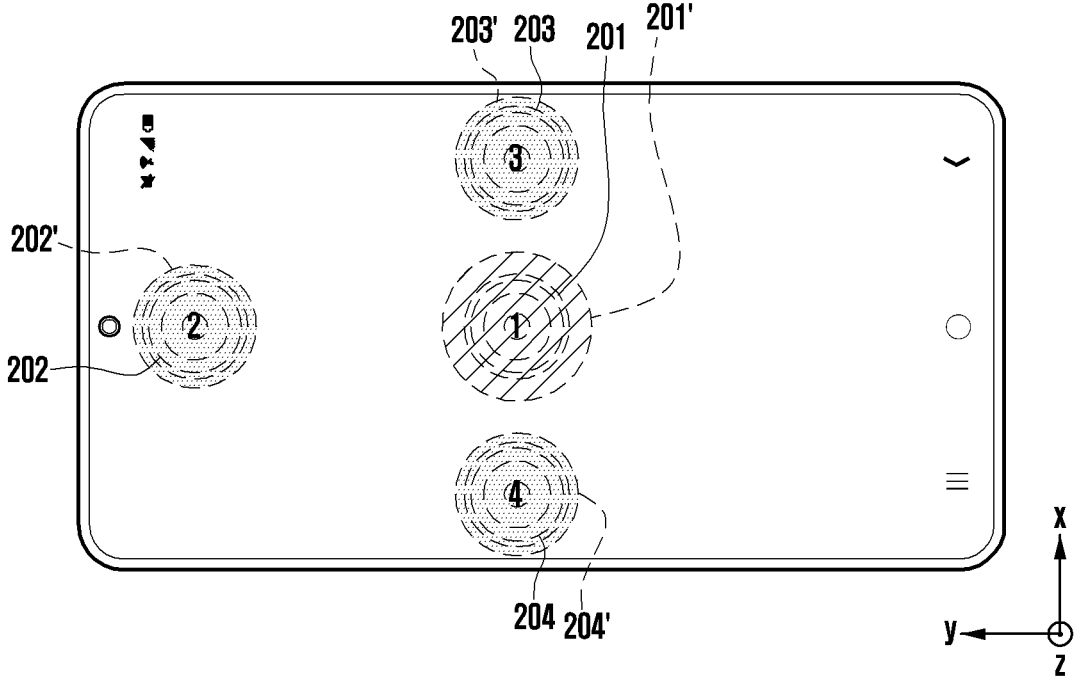
FIG. 7B is a diagram illustrating the position of a camera in a horizontal mode according to an embodiment of the disclosure.

FIG. 7A is a diagram illustrating the position of a camera in a vertical mode according to an embodiment of the disclosure. FIG. 7B is a diagram illustrating the position of a camera in a horizontal mode according to an embodiment of the disclosure.

According to various embodiments of the disclosure, an electronic device (e.g., the electronic device 101 in FIG. 1 or the electronic device 200 in FIG. 2) may include a camera module (e.g., the camera module 180 in FIG. 1 or an under-display camera (UDC)) on the rear surface of a display module (e.g., the display module 160 in FIG. 1). The camera module 180 may include at least one camera 201, 202, 203, or 204. At least one camera 201, 202, 203, or 204 may include various types of cameras (e.g., a wide-angle camera or a narrow-angle camera).

Referring to FIGS. 7A and 7B, a first camera 201 may be disposed at the center of the front surface of the display module 160, and the first camera 201 may include a wide-angle camera. For example, the electronic device 101 may capture a larger area using the first camera 201 and, if the captured image includes the user's face, obtain position information of the user's face. For example, position information of the user's face may include information about the direction in which the user is gazing. FIG. 7A shows the state in which at least one camera (e.g., UDC) is disposed on the rear surface of the display module 160 in the electronic device 101 in a vertical mode, and FIG. 7B shows the state in which at least one camera (e.g., UDC) is disposed on the rear surface of the display module 160 in the electronic device 101 in a horizontal mode.

According to an embodiment of the disclosure, the electronic device 101 may determine the sequence in which at least one of the second camera 202, the third camera 203, and/or the fourth camera 204 is selected based on the position information of the user's face. For example, if the user is primarily gazing at the position of the third camera 203 (e.g., if the face deviates from the center of the first camera 201 in the X-axis direction), the electronic device 101 may preferentially select the third camera 203 and obtain an image captured by the third camera 203. For example, the electronic device 101 may firstly select the third camera 203, secondly select the second camera 202, and thirdly select the fourth camera 204. The electronic device 101 may preferentially select a camera that is easy to identify the user's face, based on the position information of the user's face. As another example, if the user is primarily gazing at the position of the fourth camera 204 (e.g., if the face deviates from the center of the first camera 201 in the −X-axis direction), the electronic device 101 may preferentially select the fourth camera 204 and obtain an image captured by the fourth camera 204. For example, the electronic device 101 may firstly select the fourth camera 204, secondly select the second camera 202, and thirdly select the third camera 203.

According to an embodiment of the disclosure, the electronic device 101 may select a first camera (e.g., the third camera 203), based on the position information of the user's face, and obtain a first image using the selected first camera. If the first image includes the user's face, the electronic device 101 may perform a user authentication function, based on the first image. If the first image does not include the user's face, the electronic device 101 may select a second camera (e.g., the second camera 202) and obtain a second image using the selected second camera. According to an embodiment of the disclosure, the electronic device 101 may identify whether or not the user's face is included in the image obtained using the first camera and obtain an image using the second camera step by step.

Referring to FIGS. 7A and 7B, at least one camera may be disposed on the rear surface of the display module 160, and a lens unit of the at least one camera may be disposed adjacent to the rear surface. According to an embodiment of the disclosure, the electronic device 101 may configure a partial area of the display module 160 to which the lens unit is adjacent as a transmission area 201', 202', 203', or 204', and control pixels in the transmission area. For example, the electronic device 101 may perform a transparentizing operation on the transmission area 201', 202', 203', or 204'. The transparentizing operation may include an operation of transparentizing a partial area of the display module 160 and include a pixel-off operation for the pixels. On the other hand, a pixel-on operation may include an operation in which a partial area of the display module 160 is processed to be translucent.

According to an embodiment of the disclosure, in the operation of sequentially selecting at least one camera, the electronic device 101 may also sequentially perform a transparentizing operation (e.g., a pixel-off operation) on at least one transmission area 201', 202', 203', or 204'. For example, if the second camera 202 is selected, the electronic device 101 may perform a transparentizing operation on the second transmission area 202' corresponding to the second camera 202. If the third camera 203 is selected after the second camera 202, the electronic device 101 may sequentially perform a transparentizing operation on the third transmission area 203' corresponding to the third camera 203. According to an embodiment of the disclosure, the electronic device 101 may select at least one camera and selectively perform a transparentizing operation on the transmission area corresponding to the selected camera. According to an embodiment of the disclosure, the electronic device 101 may reduce unnecessary transparentizing operations, thereby reducing the time required to perform the user authentication function.

According to an embodiment of the disclosure, the electronic device 101 may select at least one camera 201, 202, 203, or 204 to perform a user authentication function and perform a transparentizing operation on at least one transmission area 201', 202', 203', or 204' corresponding to the at least one selected camera 201, 202, 203, or 204. For example, the electronic device 101 may capture an image through at least one transparentized transmission area 201', 202', 203', or 204' using at least one camera, thereby obtaining a high-quality image. According to an embodiment of the disclosure, the electronic device 101 may perform a user authentication function, based on the high-quality image, so that the security according to the user authentication function may be improved.

Figure 7C:
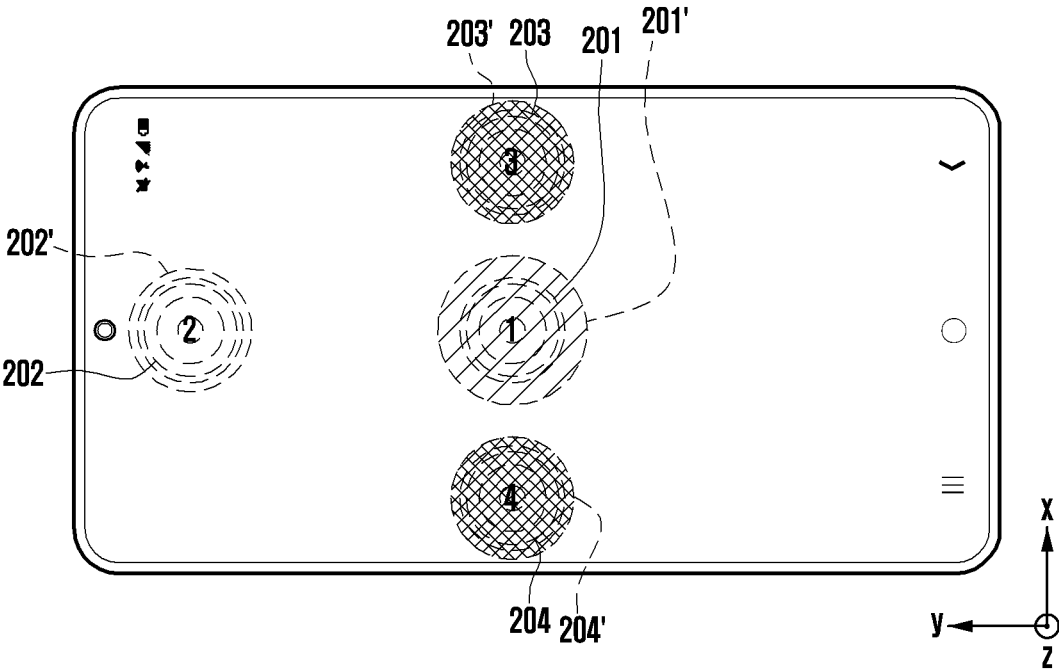
FIG. 7C is a diagram illustrating a partial area of a display module being detected as a touch area corresponding to the position of the camera according to an embodiment of the disclosure.

FIG. 7C is a diagram illustrating a partial area of a display module being detected as a touch area corresponding to the position of the camera according to an embodiment of the disclosure.

According to an embodiment of the disclosure, a display module (e.g., the display module 160 in FIG. 1) may include a touch panel for detecting a user's touch input. A processor (e.g., the processor 120 in FIG. 1) of an electronic device (e.g., the electronic device 101 in FIG. 1 or the electronic device 200 in FIG. 2) may detect a user's touch input and identify coordinate information corresponding to the touch input through the touch panel. According to an embodiment of the disclosure, based on the identified coordinate information, the processor 120 may determine whether or not transmission areas 201', 202', 203', and 204' for the cameras 201, 202, 203, and 204 disposed on the rear surface of the display module 160 are obscured by the touch input. For example, the electronic device 101 may be held by the user, and at least a partial area of the display module 160 may be obscured by the user's hand depending on the hold manner. For example, at least some of the cameras 201, 202, 203, and 204 disposed on the rear surface of the display module 160 may be obscured by the user's hand, and the processor 120 may identify coordinate information according to the user's touch input. The processor 120, based on the identified coordinate information, may identify which camera is obscured by the user's touch input, among the cameras 201, 202, 203, and 204.

Referring to FIG. 7C, the third transmission area 203' corresponding to the third camera 203 and the fourth transmission area 204' corresponding to the fourth camera 204 are obscured by the user's touch input. The processor 120 may identify coordinate information according to the user's touch input and, based on the identified coordinate information, identify that the third transmission area 203' and the fourth transmission area 204' are at least partially obscured. According to an embodiment of the disclosure, the processor 120, in response to execution of a user authentication function, may maintain the third camera 203 and the fourth camera 204, whose photographing areas (e.g., transmission areas) are partially obscured, in an inactive state. According to an embodiment of the disclosure, the processor 120, in response to execution of a user authentication function, may activate the first camera 201 and the second camera 202 to obtain an image including the user's face.

According to an embodiment of the disclosure, the processor 120 may perform a pixel-off operation (e.g., a transparentizing operation) on the first transmission area 201' corresponding to the activated first camera 201 and the second transmission area 202' corresponding to the activated second camera 202. According to an embodiment of the disclosure, the processor 120 may select at least one camera from among a plurality of cameras 201, 202, 203, and 204, based on coordinate information according to the user's touch input, and perform a pixel-off operation on the transmission area corresponding to the selected camera.

Figure 8:
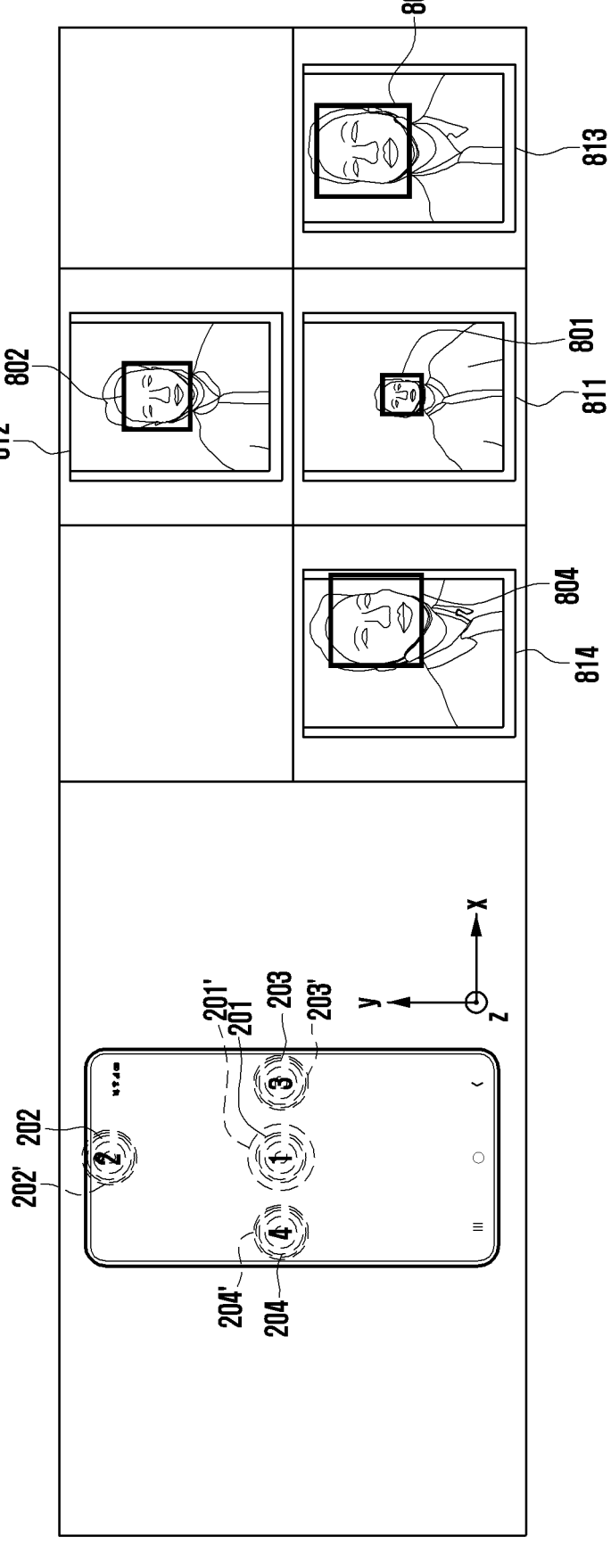
FIG. 8 is a diagram illustrating images captured at different angles depending on the position of the camera according to an embodiment of the disclosure.

FIG. 8 is a diagram illustrating images captured at different angles depending on the position of the camera according to an embodiment of the disclosure.

According to various embodiments of the disclosure, an electronic device (e.g., the electronic device 101 in FIG. 1 or the electronic device 200 in FIG. 2) may include a camera module (e.g., the camera module 180 in FIG. 1 or an under-display camera (UDC)) on the rear surface of a display module (e.g., the display module 160 in FIG. 1). The camera module 180 may include at least one camera 201, 202, 203, or 204. At least one camera 201, 202, 203, or 204 may include various types of cameras (e.g., a wide-angle camera or a narrow-angle camera).

Referring to FIG. 8, a first camera 201 may be disposed at the center of the front surface of the display module 160, and the first camera 201 may include a wide-angle camera. For example, the electronic device 101 may capture a larger area using the first camera 201 and, if the captured image includes the user's face, obtain position information of the user's face. For example, position information of the user's face may include information about the direction in which the user is gazing. Referring to FIG. 8, the processor 120 may capture a first image 811 using the first camera 201 (e.g., a wide-angle camera), and the first image 811 may be an image including a user's face 801 in a larger area. The processor 120 may obtain position information of the user's face, based on the first image 811.

Referring to FIG. 8, the electronic device 101 may include a second camera 202, a third camera 203, and/or a fourth camera 204 disposed corresponding to one side surface of the display module 160 (e.g., the housing 210 surrounding the side surface of the electronic device 101). For example, the second camera 202 may be disposed to be spaced apart in the Y-axis direction from the first camera 201 disposed at the center of the display module 160. The second camera 202 may capture an image viewed relatively from above (in the Y-axis direction). The third camera 203 may be disposed to be spaced apart in the X-axis direction from the first camera 201 and capture an image viewed toward the center in the X-axis direction. The fourth camera 204 may be disposed to be spaced apart in the –X-axis direction from the first camera 201 and capture an image viewed toward the center in the –X-axis direction. According to an embodiment of the disclosure, the electronic device 101 may capture a front image (e.g., a first image 811) of the user gazing at the center of the display module 160 using the first camera 201. The electronic device 101 may capture a front image (e.g., a second image 812) of the user viewed from above using the second camera 202. The electronic device 101 may capture front images (e.g., a third image 813 and a fourth image 814) of the user gazing at the center of the display module 160 from one side using the third camera 203 and/or the fourth camera 204. According to an embodiment of the disclosure, when selecting a plurality of cameras, the electronic device 101 may obtain a plurality of images 811, 812, 813, and 814 including the user's faces 801, 802, 803, and 804 corresponding to the plurality of cameras.

According to an embodiment of the disclosure, the processor 120 may identify whether or not the user's face 801, 802, 803, or 804 is included based on the plurality of obtained images 811, 812, 813, and 814.

According to an embodiment of the disclosure, the processor 120 may select at least one camera from among the at least one camera 201, 202, 203, or 204 and perform a pixel-off operation (e.g., a transparentizing operation) on a transmission area 201', 202', 203', or 204' corresponding to the selected camera. According to an embodiment of the disclosure, if the user's face 801 is identified in the first image 811 captured using the first camera 201 (e.g., a wide-angle camera), the processor 120 may select at least one camera from among the second camera 202, the third camera 203, and the fourth camera 204, and perform a pixel-off operation (e.g., a transparentizing operation) on a transmission area 202', 203', or 204' corresponding to the selected camera. For example, the second image 812 by the second camera 202, the third image 813 by the third camera 203, and/or the fourth image 814 by the fourth camera 204 may include high-quality images.

According to an embodiment of the disclosure, the processor 120, based on the high-quality image, may perform a user authentication function, so that the security of the user authentication function may be improved.

Figure 9A:
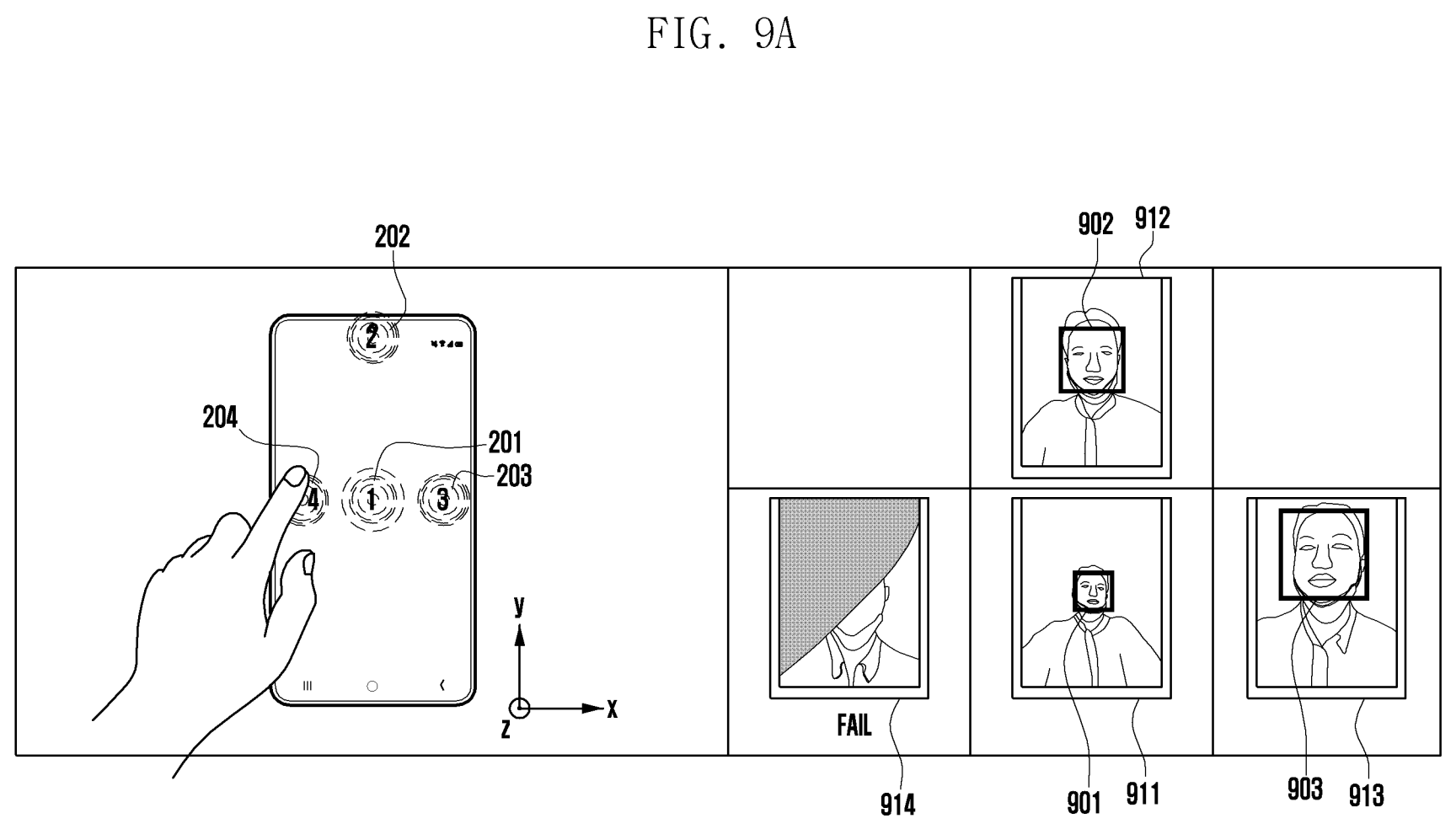
Figure 9B:
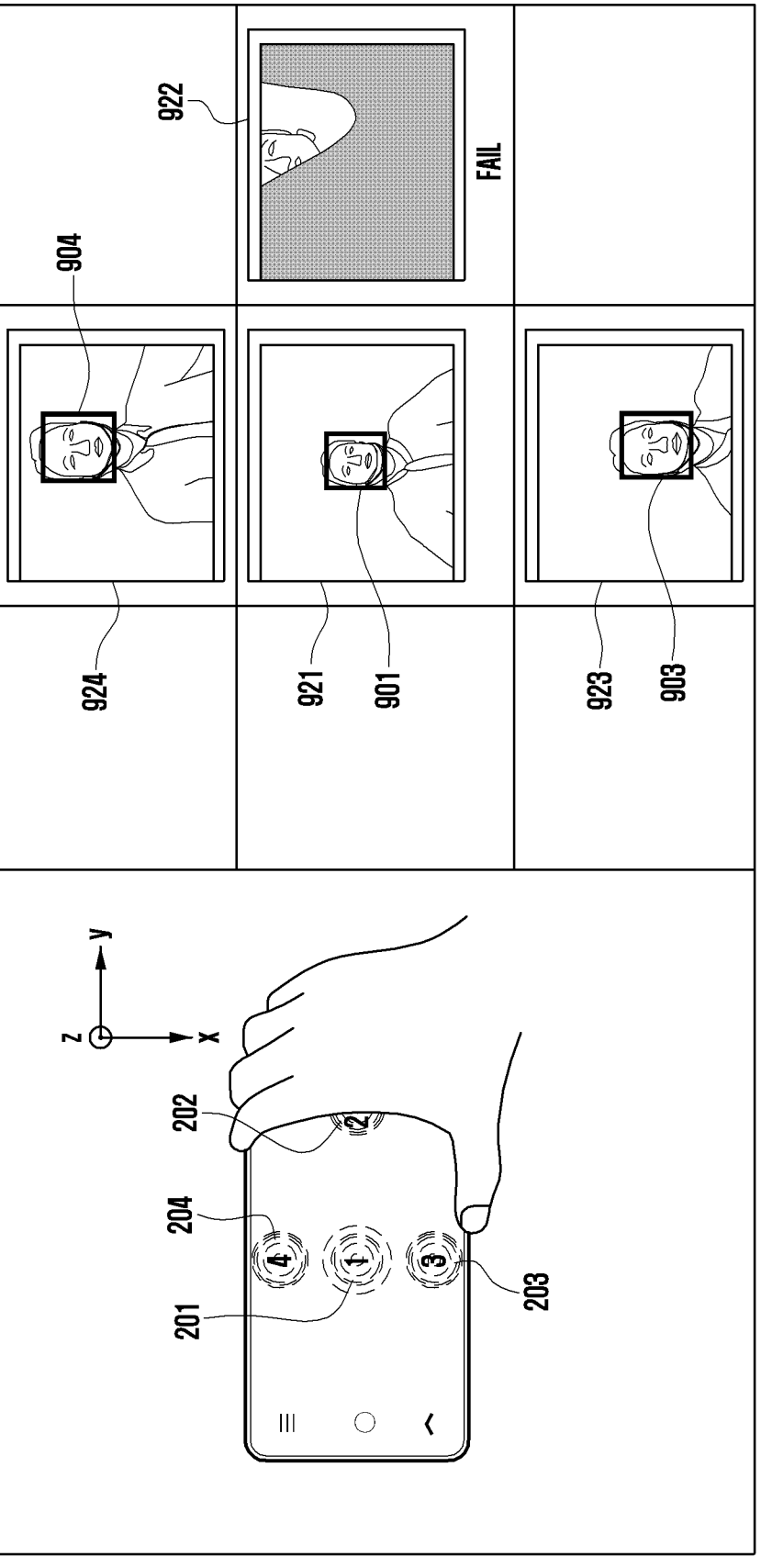
FIG. 9B illustrates a second embodiment of identifying an area where a touch input is received and selecting at least one camera in an electronic device in a horizontal mode according to an embodiment of the disclosure.

FIG. 9A illustrates a first embodiment of identifying an area where a touch input is received and selecting at least one camera in an electronic device in a vertical mode according to an embodiment of the disclosure. FIG. 9B illustrates a second embodiment of identifying an area where a touch input is received and selecting at least one camera in an electronic device in a horizontal mode according to an embodiment of the disclosure. According to various embodiments of the disclosure, an electronic device (e.g., the electronic device 101 in FIG. 1 or the electronic device 200 in FIG. 2) may include a camera module (e.g., the camera module 180 in FIG. 1 or an under-display camera (UDC)) on the rear surface of a display module (e.g., the display module 160 in FIG. 1). The camera module 180 may include at least one camera 201, 202, 203, or 204.

Referring to FIG. 9A, the electronic device 101 operating in a vertical mode may obtain a first image 911 using the first camera 201 (e.g., a wide-angle camera) and identify whether or not the first image 911 includes a user's face 901. If the first image 911 includes the user's face 901, the electronic device 101 may select at least one of the second camera 202, the third camera 203, and the fourth camera 204, and may obtain at least one of a second image 912, a third image 913, and a fourth image 914 corresponding to the selected camera. According to an embodiment of the disclosure, the electronic device 101 may determine whether or not the user's face is included based on the obtained image. For example, the electronic device 101 may determine whether or not the user's face is included based on whether or not the obtained image includes the user's eyes, nose, and mouth. Referring to FIG. 9A, it may be identified that the fourth image 914 does not include the user's face.

According to an embodiment of the disclosure, the electronic device 101 may implement a 3D image, based on the first image 911, the second image 912 including a user's face 902, and the third image 913 including the user's face 903 and perform a user authentication function, based on the 3D image.

Referring to FIG. 9B, the electronic device 101 operating in a horizontal mode may obtain a first image 921 using the first camera 201 (e.g., a wide-angle camera) and identify whether or not the first image 921 includes the user's face 901. If the first image 921 includes the user's face 901, the electronic device 101 may select at least one of the second camera 202, the third camera 203, and the fourth camera 204, and may obtain at least one of a second image 922, a third image 923, and a fourth image 924 corresponding to the selected camera. According to an embodiment of the disclosure, the electronic device 101 may determine whether or not the user's face is included based on the obtained image. For example, the electronic device 101 may determine whether or not the user's face is included based on whether or not the obtained image includes the user's eyes, nose, and mouth. Referring to FIG. 9B, it may be identified that the second image 922 does not include the user's face.

According to an embodiment of the disclosure, the electronic device 101 may implement a 3D image, based on the first image 921, the third image 923, and the fourth image 924 including the user's face 904, and perform a user authentication function, based on the 3D image.

According to an embodiment of the disclosure, the electronic device 101 may select at least one camera 201, 202, 203, or 204 for photographing a subject and perform a pixel-off operation (e.g., a transparentizing operation) on a transmission area 201', 202', 203', or 204' corresponding to the selected camera. According to an embodiment of the disclosure, the electronic device 101 may selectively perform a pixel-off operation (e.g., transparentizing operation) on a partial area of the display module 160 and reduce the processing time according to the execution of the pixel-off operation.

According to an embodiment of the disclosure, if the user authentication function is successfully performed, the electronic device 101 may store the obtained image in memory (e.g., the memory 130 in FIG. 1) and utilize the same as authentication information related to the user authentication function. According to an embodiment of the disclosure, if user authentication is successful, the electronic device 101 may update information related to the user authentication, based on the image through which the user authentication is successful.

A method according to various embodiments may include performing a function for user authentication, identifying face position information of a user using at least one camera (e.g., the camera module 180 in FIG. 1) disposed on the rear surface of a display module (e.g., the display module 160 in FIG. 1), identifying coordinate information according to a user's touch input received through the display module 160, selecting the at least one camera, based on the face position information and the coordinate information, obtaining at least one image using the at least one selected camera, and performing the function for user authentication, based on the at least one obtained image.

According to an embodiment of the disclosure, the identifying of the face position information of the user may include obtaining a first image including the user's face using a wide-angle camera (e.g., the wide-angle camera 311 in FIG. 3) included in the at least one camera, and identifying the face position information of the user, based on the first image.

According to an embodiment of the disclosure, the performing of the function for user authentication may include, based on the face position information of the user, selecting a narrow-angle camera (e.g., the narrow-angle camera 312 in FIG. 3) included in the at least one camera, obtaining a second image using the at least one selected narrow-angle camera, and performing the user authentication, based on the obtained second image.

The method according to an embodiment may further include identifying a partial area of the display module 160 corresponding to the position of the at least one selected camera, and performing a transparentizing operation on the identified partial area.

According to an embodiment of the disclosure, the transparentizing operation may include turning off at least one pixel constituting the display module 160.

The method according to an embodiment may further include selecting a first camera, based on the face position information of the user, performing a transparentizing operation on a partial area of the display module corresponding to the first camera, and obtaining the at least one image through the transparentized partial area using the first camera.

The method according to an embodiment may further include selecting a second camera, if the user's face is not identified in the at least one obtained image, based on the face position information of the user, performing a transparentizing operation on a partial area of the display module corresponding to the second camera, and obtaining the at least one image through the transparentized partial area using the second camera.

The method according to an embodiment may further include producing a three-dimensional (3D) image, if there is a plurality of obtained images, based on the plurality of images, and performing the function for user authentication, based on the produced 3D image.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. It is intended that features described with respect to separate embodiments of the disclosure, or features recited in separate claims, may be combined unless such a combination is explicitly specified as being excluded or such features are incompatible. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a plurality of under-display cameras (UDCs);
memory, comprising one or more storage media, storing instructions and information related to user authentication; and
one or more processors communicatively coupled to the display, the plurality of UDCs, and the memory,
wherein the instructions, when executed by the one or more processors, cause the electronic device to:
identify face position information of a user for a function of user authentication using at least one of the plurality of UDCs,
identify coordinate information of a user's touch input obscuring at least one UDC,
select at least one UDC among the plurality of UDCs able to obtain an image including a user's face for user authentication, based on the face position information and the coordinate information,
obtain at least one image including the user's face using the selected at least one UDC, and
perform the function of user authentication, based on the obtained at least one image.

2. The electronic device of claim 1, further comprising:
a touch sensor,
wherein the instructions, when executed by the one or more processors, further cause the electronic device to:
detect the user's touch input through the touch sensor, and
identify the coordinate information corresponding to the detected user's touch input.

3. The electronic device of claim 1,
wherein the plurality of UDCs comprises a first UDC in a first photographing range and a second UDC in a second photographing range that is smaller than the first photographing range,
wherein the instructions, when executed by the one or more processors, further cause the electronic device to:
obtain a first image comprising the user's face using the first UDC in the first photographing range,
identify the face position information of the user, based on the first image,
select the second UDC in the second photographing range, based on the face position information of the user,
obtain a second image using the selected second UDC in the second photographing range, and
perform the function of user authentication, based on the obtained second image, and
wherein the first image comprises a low-quality image and the second image comprises a high-quality image.

4. The electronic device of claim 1,
wherein the instructions, when executed by the one or more processors, further cause the electronic device to:
identify a partial area of the display corresponding to a position of the selected at least one UDC, and
perform a transparentizing operation on the identified partial area, and
wherein the transparentizing operation comprises turning off at least one pixel constituting the display.

5. The electronic device of claim 1, wherein the instructions, when executed by the one or more processors, further cause the electronic device to:

select a first UDC of the plurality of UDCs, based on the face position information of the user, perform a transparentizing operation on a partial area of the display corresponding to the first UDC, and obtain the at least one image through the transparentized partial area using the first UDC.

6. The electronic device of claim 5, wherein the instructions, when executed by the one or more processors, further cause the electronic device to:

select a second UDC of the plurality of UDCs, in case that the user's face is not identified in the obtained at least one image, based on the face position information of the user, perform a transparentizing operation on a partial area of the display corresponding to the second UDC, and obtain the at least one image through the transparentized partial area using the second UDC.

7. The electronic device of claim 1, wherein the instructions, when executed by the one or more processors, further cause the electronic device to:

obtain at least one image using the at least one UDC, and in case that the user's face is not identified in the obtained at least one image, display guide information to induce the user to gaze at the display.

8. The electronic device of claim 1, wherein the instructions, when executed by the one or more processors, further cause the electronic device to:

produce a three-dimensional (3D) image, in case that there is a plurality of images, based on the plurality of images, and perform the function of user authentication, based on the produced 3D image.

9. The electronic device of claim 1, wherein the instructions, when executed by the one or more processors, further cause the electronic device to:

determine whether or not the user's face is identified based on the obtained at least one image, and in case that the user's face is not identified, deactivate a UDC that captured the image in which the user's face is not identified.

10. A method of an electronic device, the method comprising:

identifying face position information of a user for a function of user authentication using at least one of a plurality of under-display cameras (UDCs) included in the electronic device;

identifying coordinate information of a user's touch input obscuring at least one UDC through a display of the electronic device;

selecting at least one UDC among the plurality of UDCs able to obtain an image including a user's face for user authentication, based on the face position information and the coordinate information;

obtaining at least one image including the user's face using the selected at least one UDC; and performing the function of user authentication, based on the obtained at least one image.

11. The method of claim 10, wherein the identifying of the face position information of the user comprises:

obtaining a first image comprising the user's face using a first UDC in a first photographing range among the plurality of UDCs; and identifying the face position information of the user, based on the first image.

12. The method of claim 11, wherein the performing of the function of user authentication comprises:

based on the face position information of the user, selecting a second UDC in a second photographing range, which is smaller than the first photographing range, among the plurality of UDCs;

obtaining a second image using the selected second UDC in the second photographing range; and performing the function of user authentication, based on the obtained second image.

13. The method of claim 10, further comprising:

identifying a partial area of the display corresponding to a position of the selected at least one UDC; and performing a transparentizing operation on the identified partial area, wherein the transparentizing operation comprises turning off at least one pixel constituting the display.

14. The method of claim 10, further comprising:

selecting a first UDC of the plurality of UDCs, based on the face position information of the user;

performing a transparentizing operation on a partial area of the display corresponding to the first UDC; and obtaining the at least one image through the transparentized partial area using the first UDC.

15. The method of claim 14, further comprising:

selecting a second UDC of the plurality of UDCs, in case that the user's face is not identified in the obtained at least one image, based on the face position information of the user;

performing a transparentizing operation on a partial area of the display corresponding to the second UDC; and obtaining the at least one image through the transparentized partial area using the second UDC.

16. The method of claim 10, further comprising:

obtaining at least one image using the at least one UDC; and in case that the user's face is not identified in the obtained at least one image, displaying guide information to induce the user to gaze at the display.

17. The method of claim 10, further comprising:

detecting the user's touch input through a touch sensor; and identifying the coordinate information corresponding to the detected user's touch input.

18. The method of claim 10, further comprising:

producing a three-dimensional (3D) image, in case that there is a plurality of images, based on the plurality of images; and performing the function of user authentication, based on the produced 3D image.

19. One or more non-transitory computer-readable storage media storing computer-executable instructions that, when executed by one or more processors of an electronic device, cause the electronic device to perform operations, the operations comprising:

identifying face position information of a user for a function of user authentication using at least one of a plurality of under-display cameras (UDCs) included in the electronic device;

identifying coordinate information of a user's touch input obscuring at least one UDC through a display of the electronic device;

selecting at least one UDC among the plurality of UDCs able to obtain an image including a user's face, based on the face position information and the coordinate information;

obtaining at least one image including the user's face using the selected at least one UDC; and performing the function of user authentication, based on the obtained at least one image.

20. The one or more non-transitory computer-readable storage media of claim 19, the operations further comprising:

obtaining a first image comprising the user's face using a first UDC in a first photographing range among the plurality of UDCs; and identifying the face position information of the user, based on the first image.

\* \* \* \* \*